United States Patent
Johansson et al.

(10) Patent No.: US 9,628,247 B2
(45) Date of Patent: *Apr. 18, 2017

(54) RADIO ACCESS NETWORK NODE AND MOBILE STATION WITH INCREASED ACK/NACK SPACE FOR PACKET DOWNLINK ACK/NACK MESSAGE

(71) Applicant: TELEFONAKTIEBOLAGET LM ERICSSON (PUBL), Stockholm (SE)

(72) Inventors: Nicklas Johansson, Brokind (SE); Mårten Sundberg, Årsta (SE); Björn Hofström, Linköping (SE); Paul Schliwa-Bertling, Ljungsbro (SE); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/177,228

(22) Filed: Jun. 8, 2016

(65) Prior Publication Data

US 2016/0285610 A1 Sep. 29, 2016

Related U.S. Application Data

(63) Continuation of application No. 14/274,494, filed on May 9, 2014, now Pat. No. 9,391,755.

(Continued)

(51) Int. Cl.
*H04L 5/00* (2006.01)
*H04L 1/00* (2006.01)
(Continued)

(52) U.S. Cl.
CPC .......... *H04L 5/0055* (2013.01); *H04L 1/0025* (2013.01); *H04L 1/0028* (2013.01);
(Continued)

(58) Field of Classification Search
CPC ... H04L 1/0025; H04L 1/0031; H04L 1/1614; H04L 1/1685; H04L 1/1896; H04L 5/0055
(Continued)

(56) References Cited

U.S. PATENT DOCUMENTS

2001/0052091 A1* 12/2001 Goldsack .................. H04L 1/20 714/704
2005/0105503 A1* 5/2005 Cayla ..................... H04L 1/1685 370/346

(Continued)

FOREIGN PATENT DOCUMENTS

EP 1 936 851 A2 6/2008
WO WO 2008/157770 A2 12/2008

OTHER PUBLICATIONS

3GPP TS 44.060 V11.4.0(Mar. 2013) 3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (Release 11), the whole document.

(Continued)

*Primary Examiner* — Chi H Pham
*Assistant Examiner* — Robert Lopata

(57) ABSTRACT

A radio access network node (e.g., base station system), a mobile station, and various methods are described herein that increase the size and/or efficiency of an ack/nack bitmap in one or more control messages (e.g., Packet Downlink Ack/Nack message(s)). The mobile station when operating in a Downlink Multi Carrier mode sends the one or more control messages to the radio access network node.

26 Claims, 16 Drawing Sheets

Related U.S. Application Data

(60) Provisional application No. 61/822,687, filed on May 13, 2013.

(51) Int. Cl.
 *H04L 1/16* (2006.01)
 *H04L 1/18* (2006.01)

(52) U.S. Cl.
 CPC .......... *H04L 1/0031* (2013.01); *H04L 1/1614* (2013.01); *H04L 1/1685* (2013.01); *H04L 1/1896* (2013.01)

(58) Field of Classification Search
 USPC ........................................ 370/329
 See application file for complete search history.

(56) References Cited

U.S. PATENT DOCUMENTS

| | | | | |
|---|---|---|---|---|
| 2005/0180324 | A1* | 8/2005 | Niemela | H04L 1/1614 370/230 |
| 2008/0307284 | A1* | 12/2008 | Aghili | H04L 5/0053 714/748 |
| 2009/0276674 | A1* | 11/2009 | Wei | H04L 1/16 714/749 |
| 2010/0120464 | A1* | 5/2010 | Bjorken | H04L 1/0003 455/522 |
| 2011/0051661 | A1* | 3/2011 | Venkob | H04L 1/1685 370/328 |
| 2012/0120891 | A1* | 5/2012 | Mazzarese | H04W 72/042 370/329 |
| 2012/0213088 | A1* | 8/2012 | Faurie | H04L 1/0028 370/241 |
| 2012/0213153 | A1* | 8/2012 | Faurie | H04L 1/0026 370/328 |
| 2012/0257605 | A1* | 10/2012 | Abraham | H04B 7/0626 370/338 |
| 2014/0098694 | A1* | 4/2014 | Damji | H04W 52/0229 370/252 |
| 2014/0243037 | A1* | 8/2014 | Sikri | H04W 52/44 455/522 |
| 2014/0328155 | A1* | 11/2014 | Dhanda | H04L 1/0003 370/215 |
| 2015/0009950 | A1 | 1/2015 | Sundberg et al. | |

OTHER PUBLICATIONS

Telefon AB LM Ericsson, ST-Ericsson SA, "DLMC—Simulations of increased SNS and PDAN space", 3GPP TSG GERAN#58, Tdoc GP-130510, Xiamen, P.R. China, Nov. 13-17, 2012, the whole document.

Telefon AB LM Ericsson et al., "DLMC PDAN Message Capacity", 3GPP TSG GERAN#57, Tdoc GP-130213, Vienna, Austria; Feb. 25-Mar. 1, 2013, Sections 1-3, 5-7, Annex A.

Telefon AB LM Ericsson, ST-Ericsson SA, "New PDAN Message for DLMC Mode", 3GPP TSG GERAN#56, Tdoc GP-121277, Prague, Czech Republic; Nov. 19-23, 2012, the whole document.

Telefon AB LM Ericsson, "DLMC—Simulations of increased SNS and PDAN Space (Update of GP-131061)", 3GPP TSG GERAN#60, Tdoc GP-131095, Zhuhai, P.R. China, Nov. 18-22, 2013, Sections 3, 5 and 6.

* cited by examiner

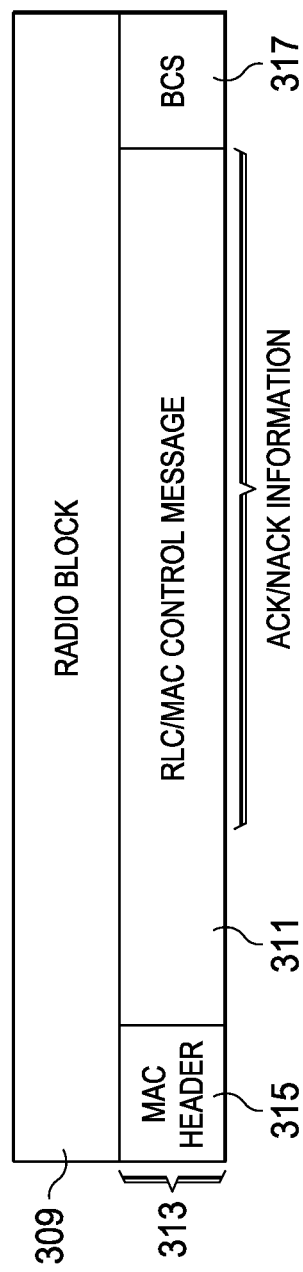

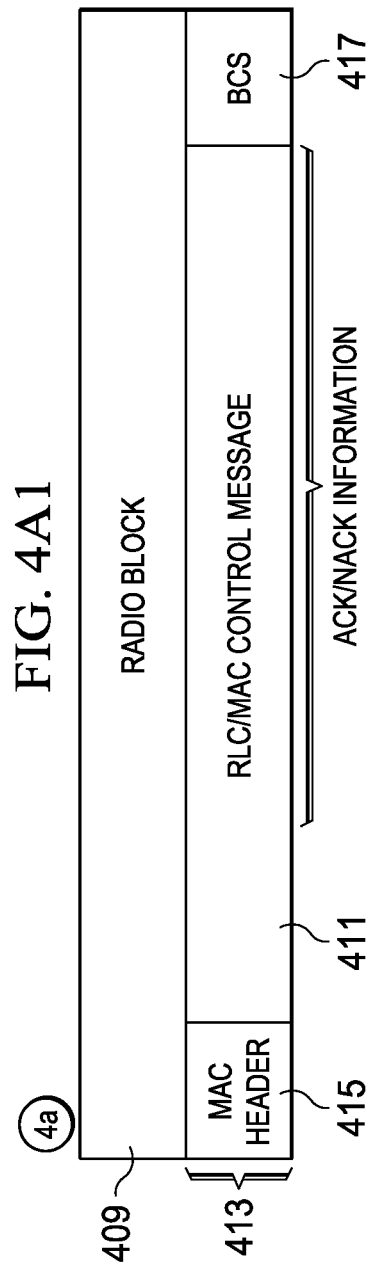
FIG. 4A1

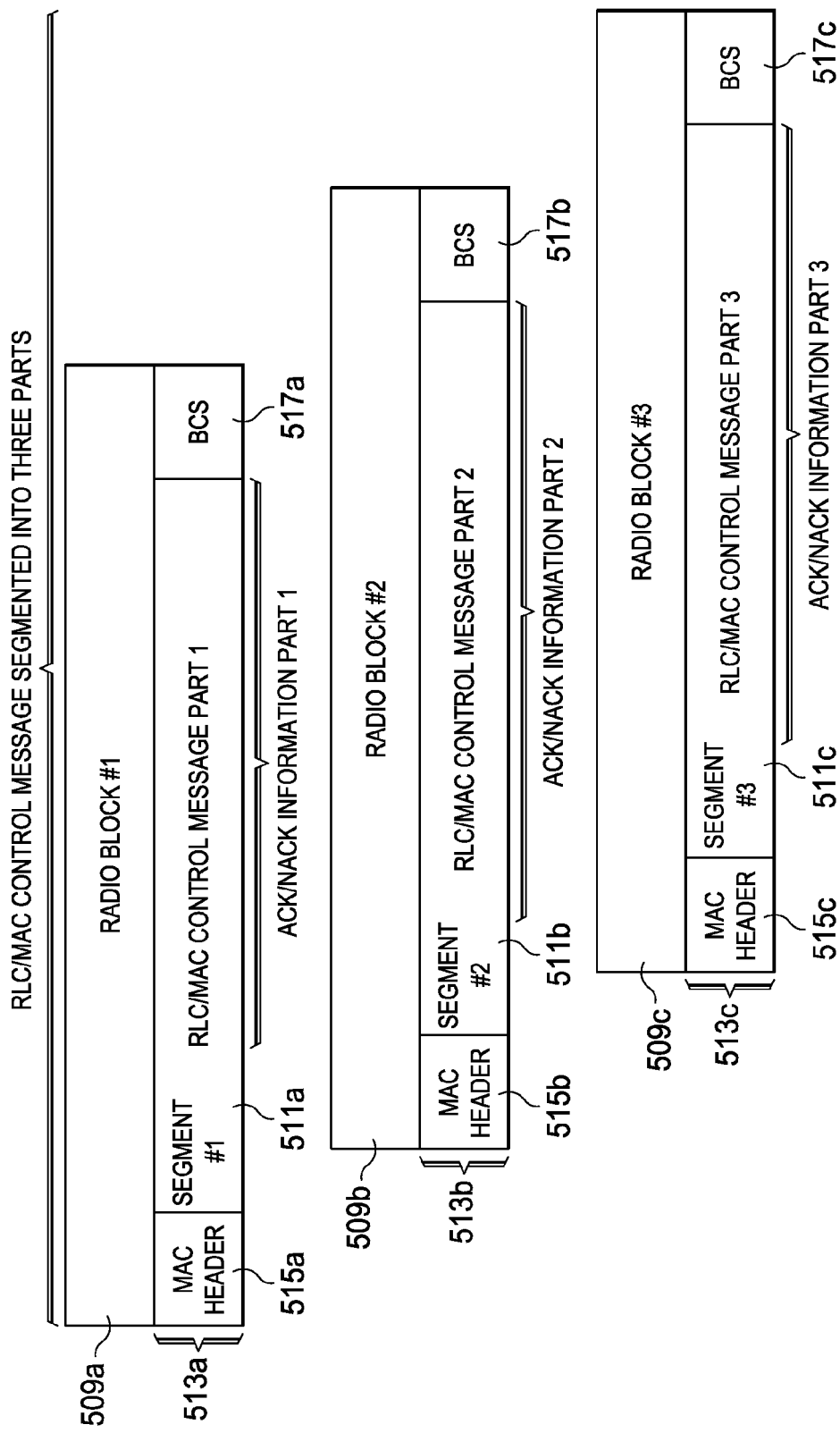
FIG. 5A1

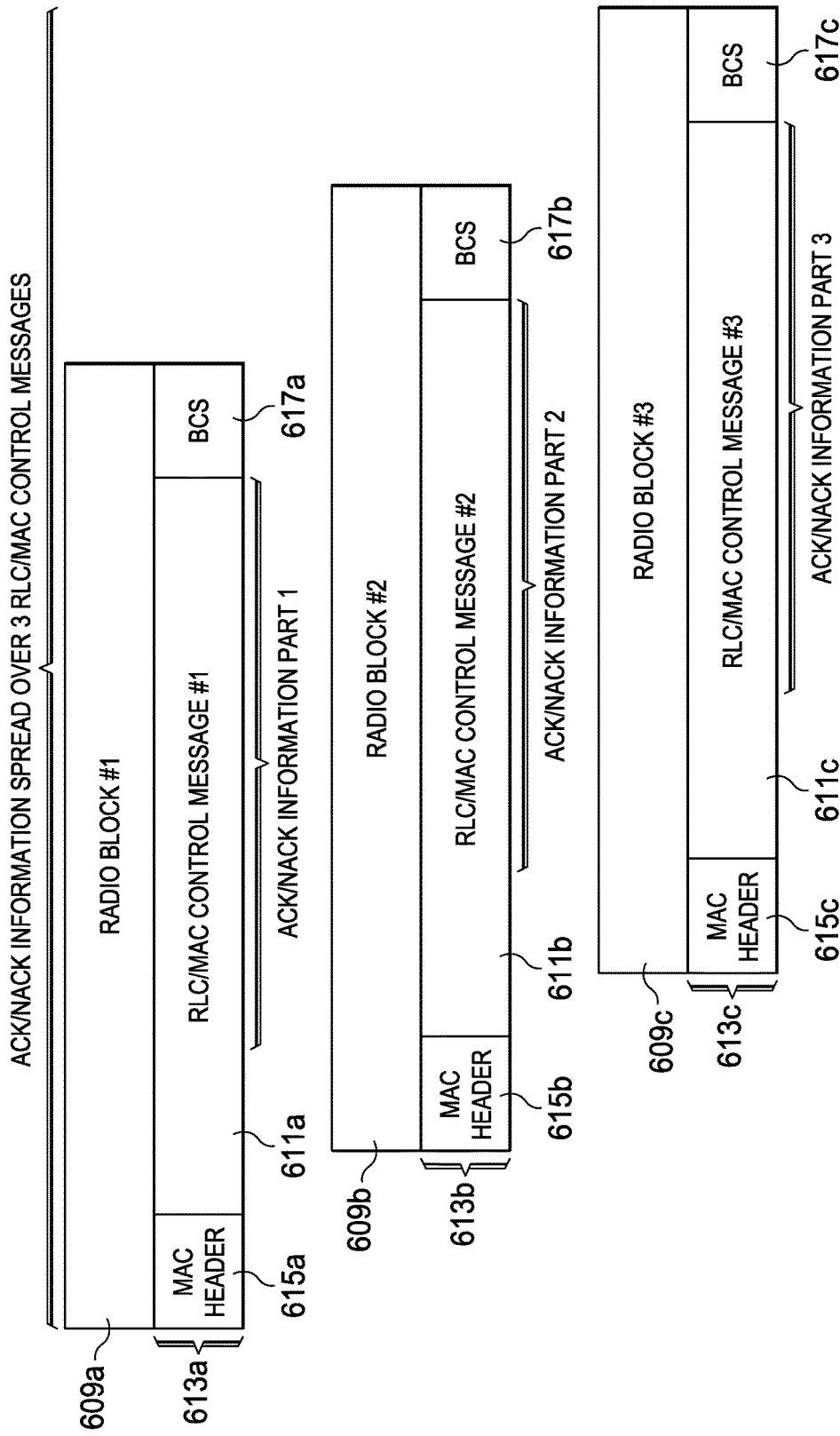

RADIO ACCESS NETWORK NODE AND MOBILE STATION WITH INCREASED ACK/NACK SPACE FOR PACKET DOWNLINK ACK/NACK MESSAGE

CLAIM OF PRIORITY

This application is a Continuation of U.S. patent application Ser. No. 14/274,494, filed on May 9, 2014, now U.S. Pat. No. 9,391,755 (issued Jul. 12, 2016), which claims the benefit of U.S. Provisional Application Ser. No. 61/822,687 filed on May 13, 2013 and entitled "Increased Ack/Nack Space for PDANs". The entire contents of each of these applications are hereby incorporated by reference for all purposes.

TECHNICAL FIELD

The present invention relates to a radio access network node (e.g., base station system), a mobile station, and various methods that increase the size and/or efficiency of an Ack/Nack bitmap in one or more control messages (e.g., Packet Downlink Ack/Nack message(s)). The mobile station when operating in a Downlink Multi Carrier mode sends the one or more control messages to the radio access network node.

BACKGROUND

The following abbreviations are herewith defined, at least some of which are referred to within the following description of the prior art and the present invention.
3GPP Third Generation Partnership Project
ACK Acknowledgement
BCS Block Check Sequence
BEP Bit Error Rate Probability
BLEP Block Error Rate Probability
BLER Block Error Rate
BSS Base Station System
BTS Base Transceiver Station
CPS Coding and Puncturing Scheme Indicator
CRC Cyclic Redundancy Check
CS Coding Scheme
DLMC Downlink Multi Carrier
EDGE Enhanced Data rates for GSM Evolution
EGPRS Enhanced GPRS
GERAN GSM EDGE Radio Access Network
GPRS General Packet Radio Service
GSM Global System for Mobile communications
LLC Logical Link Control
MAC Medium Access Control
MCS Modulation and Coding Scheme
MS Mobile Station
NACK Negative Acknowledgment
PACCH Packet Associated Control Channel
PAN Piggy Backed Ack/Nack
PDAN Packet Downlink Ack/Nack Message
RLC Radio Link Control
SF Stealing Flag
TBF Temporary Block Flow
TCP Transmission Control Protocol
TFI Transport Format Indicator
UAS EGPRS2 Uplink level A modulation and coding Scheme
UL Uplink In wireless networks the radio interface uses protocols that operate in an acknowledged mode to ensure that packet data is transferred reliably from a radio access network node to a mobile station (MS). For instance, with the GPRS radio interface the MS sends Ack/Nack reports to a radio access network node (e.g., BSS) which indicate whether or not downlink data blocks sent by the BSS to the MS using the Radio Link Control (RLC) protocol were received correctly. The MS does this by including an Ack/Nack bitmap in the so called Packet Downlink Ack/Nack (PDAN) message. The BSS uses a polling mechanism to trigger the MS to send the Ack/Nack reports. In particular, the BSS sends a poll indication requesting the MS to send the PDAN message using a specific uplink radio block. In the RLC acknowledged mode, any damaged data block that was received by the MS will be resent by the BSS if the corresponding Ack/Nack bitmap element in the PDAN message indicates "Nack". Similarly, when the BSS receives a PDAN message with an "Ack" indication for a given data block it indicates that the MS correctly received that data block and then the BSS can slide a RLC transmit window forward. In particular, when the BSS receives confirmation that the oldest outstanding transmitted data block has been correctly received by MS then the BSS will slide the lower edge of the RLC transmit window forward to reflect the next oldest transmitted data block for which an "Ack" is still pending. For more details about this RLC acknowledged mode of operation see 3GPP TS 44.060 V11.4.0 (2013-03) "$3^{rd}$ Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 11). The contents of this document are hereby incorporated by reference herein.

Referring to FIG. 1 (PRIOR ART), there is a basic diagram of a radio access network node 100 (e.g., BSS 100) which is coupled to a radio access network 101 and multiple BTSs 102 (only two shown) where the BSS 100 is shown interacting via one of the BTSs 102 over the GPRS radio interface 104 with the MS 106 (only one shown) utilizing a relatively new mode of operation called Downlink Multi Carrier which is currently being standardized within GERAN. In this new mode of operation, the BSS 100 sends data blocks $103_1$, $103_2$ . . . $103_n$ using multiple downlink carriers $105_1$, $105_2$ . . . $105_x$ (each downlink carrier is used to transmit one or more data blocks) during each radio block period to the MS 106 which utilizes a wideband receiver to receive the data blocks $103_1$, $103_2$ . . . $103_n$ on multiple downlink carriers $105_1$, $105_2$ . . . $105_x$ thereby increasing the downlink bandwidth (throughput) (see FIG. 1's step 1). As in the past, the BSS 100 will send the MS 106 a poll indication 107 which triggers the MS 106 to send a PDAN message 109 (control message 109) (see FIG. 1's step 2—note the poll indication 107 could be sent using any one of the data blocks $103_1$, $103_2$ . . . $103_n$) and indicates a specific uplink radio block the MS is to use for sending the PDAN. However, the MS 106 will, for any given uplink radio block period, still only use a single uplink carrier 111 to send one PDAN message 109 (see FIG. 1's step 3) and will therefore have the challenge of keeping-up from an Ack/Nack perspective with the significantly increased rate at which it can receive the data blocks $103_1$, $103_2$ . . . $103_n$ sent on the multiple downlink carriers ($105_1$, $105_2$ . . . $105_x$) by the BSS 100.

The current solution where the MS 106 sends the PDAN message 109 with a coding scheme CS-1 is based on a scenario where the MS 106 is receiving, at most, two carriers $105_1$, $105_2$ per radio block period as in a Downlink Dual Carrier operation. However, when introducing the possibility for the MS 106 to receive more than two carriers $105_1$ and $105_2$ and up to sixteen carriers $105_1, 105_2 \ldots 105_{16}$ which is possible in the Downlink Multi Carrier operation it is not sufficient for the MS 106 to respond with a single PDAN message 109 using coding scheme CS-1 as it may not allow the BSS 100 to advance the lower edge of the RLC transmit window forward at the same rate as it is sending the data blocks $103_1, 103_2 \ldots 103_n$ on the downlink carriers $105_1, 105_2 \ldots 105_{16}$ to the MS 106. Even if the BSS 100 used an increased RLC transmit window size there would still be an imbalance in a rate at which the BSS 100 transmits downlink data blocks $103_1, 103_2 \ldots 103_n$ and a rate the MS 106 acknowledges these data blocks $103_1, 103_2 \ldots 103_n$ which results in the stalling of a downlink RLC engine at the BSS 100 and thereby result in a less than optimal downlink bandwidth (throughput).

Moreover, in order not to stall other layers which are located above the RLC protocol such as e.g., the Transmission Control Protocol (TCP) layer there must be sufficient uplink transmission bandwidth available to allow the MS 106 to send e.g., TCP Acks. The TCP Acks are carried as the payload within LLC packet data units which are in turn each sent using one or more uplink data blocks at the RLC layer, in addition to sending the PDAN messages 109 (i.e. control blocks) on the uplink. In other words, sending PDAN messages 109 at a rate that allows for maintaining a balance in the rate at which the BSS 100 transmits downlink data blocks $103_1, 103_2 \ldots 103_n$ and the rate the MS 106 acknowledges these data blocks $103_1, 103_2 \ldots 103_n$ must not be so uplink bandwidth intensive such that there is little room for the MS 106 to send uplink data blocks that provide "Acks" (i.e. uplink radio blocks that do not provide a PDAN) that may be required for successful operation of the higher layer protocols. In view of the foregoing, it can be appreciated that there is a need to address the aforementioned problems and other related problems so there is a balance between the rate at which data blocks $103_1, 103_2 \ldots 103_n$ are transmitted to the MS 106 utilizing the Downlink Multi Carrier operation and the rate at which the MS 106 acknowledges receipt of the data blocks $103_1, 103_2 \ldots 103_n$.

SUMMARY

A radio access network node (e.g., base station system), a mobile station, and various methods which address the aforementioned problems and other related problems are described in the independent claims of the present application. Advantageous embodiments of the radio access network node (e.g., base station system), the mobile station, and the various methods have been described in the dependent claims of the present application.

In one aspect, the present invention comprises a radio access network node adapted to receive at least one control message with increased space for acknowledgement information and non-acknowledgment information from a mobile station. The radio access network node comprises at least one processor and at least one memory that stores processor-executable instructions, wherein the at least one processor interfaces with the at least one memory to execute the processor-executable instructions, whereby the radio access network node is operable to implement a first sending operation, a second sending operation, and a receiving operation. In the first sending operation, data blocks are sent to the mobile station using two or more downlink carriers within a single radio block period. In the second sending operation, a poll indication is sent to the mobile station (note: one of the data blocks can optionally provide the poll indication). In the receiving operation, at least one radio block with at least one control message are received on an uplink carrier from the mobile station (note: the uplink carrier can correspond to the downlink carrier on which the mobile station received a data block providing the poll indication or the poll indication could indicate a specific uplink carrier the MS is to use for sending the control message(s)). The at least one control message contains at least one of acknowledgment information and non-acknowledgement information associated with a subset (all or a portion) of the sent data blocks. Further, the at least one control message is coded with a selected coding scheme that is a coding scheme 1 (CS-1) or higher and the selected coding scheme is based at least in part on at least one predefined condition. An advantage of the present invention is that the downlink throughput for the mobile station operating in the Downlink Multi Carrier mode can be significantly increased by introducing a means for the radio access network node to receive one or more control messages, each with an increased Ack/Nack bitmap space, from the mobile station.

In another aspect, the present invention comprises a method in a radio access network node for receiving at least one control message with increased space for acknowledgement information and non-acknowledgment information from a mobile station. The method comprises a first sending step, a second sending step, and a receiving step. In the first sending step, the radio access network node sends data blocks to the mobile station using two or more downlink carriers within a single radio block period. In the second sending step, the radio access network node sends a poll message to the mobile station (note: one of the data blocks can optionally provide the poll indication). In the receiving step, the radio access network node receives at least one radio block with at least one control message on an uplink carrier from the mobile station (note: the uplink carrier can correspond to the downlink carrier on which the mobile station received a data block providing the poll indication or the poll indication could indicate a specific uplink carrier the MS is to use for sending the control message(s)). The at least one control message contains at least one of acknowledgment information and non-acknowledgement information associated with a subset (all or a portion) of the sent data blocks. Further, the at least one control message is coded with a selected coding scheme that is a coding scheme 1 (CS-1) or higher and the selected coding scheme is based at least in part on at least one predefined condition. An advantage of the present invention is that the downlink throughput for the mobile station operating in the Downlink Multi Carrier mode can be significantly increased by introducing a means for the radio access network node to receive one or more control messages, each with an increased Ack/Nack bitmap space, from the mobile station.

In another aspect, the present invention comprises a mobile station adapted to send at least one control message with increased space for acknowledgement information and non-acknowledgment information to a radio access network node. The mobile station comprises at least one processor and at least one memory that stores processor-executable instructions, wherein the at least one processor interfaces with the at least one memory to execute the processor-executable instructions, whereby the mobile station is operable to implement a first receiving operation, a second receiving operation, and a sending operation. In the first receiving operation, data blocks are received on two or more downlink carriers within a single radio block period from the radio access network node. In the second receiving operation, a poll indication is received from the radio access network node (note: one of the data blocks can optionally provide the poll indication). In the sending operation, at least one radio block with at least one control message is sent on an uplink carrier to the radio access network node (note: the uplink carrier can correspond to the downlink carrier on which the mobile station received a data block providing the poll indication or the poll indication could indicate a specific uplink carrier the MS is to use for sending the control message(s)). The at least one control message contains at least one of acknowledgment information and non-acknowledgement information associated with a subset (all or a portion) of the data blocks received on the two or more downlink carriers. Further, the at least one control message is coded with a selected coding scheme that is a coding scheme 1 (CS-1) or higher and the selected coding scheme is based at least in part on at least one predefined condition. An advantage of the present invention is that the downlink throughput for the mobile station operating in the Downlink Multi Carrier operation can be significantly increased by introducing a means for the mobile station to send one or more control messages, each with an increased Ack/Nack bitmap space, on an uplink carrier to the radio access network node.

In still yet another aspect, the present invention comprises a method in a mobile station for sending at least one control message with increased space for acknowledgement information and non-acknowledgment information to a radio access network node. The method comprises a first receiving step, a second receiving step, and a sending step. In the first receiving step, the mobile station receives data blocks on two or more downlink carriers within a single radio block period from the radio access network node. In the second receiving step, the mobile station receives a poll indication from the radio access network node (note: one of the data blocks can optionally provide the poll indication). In the sending step, the mobile station sends at least one radio block with at least one control message on an uplink carrier to the radio access network node (note: the uplink carrier can correspond to the downlink carrier on which the mobile station received a data block providing the poll indication or the poll indication could indicates a specific uplink carrier the MS is to use for sending the control message(s)). The at least one control message contains at least one of acknowledgment information and non-acknowledgement information associated with a subset (all or a portion) of the data blocks received on the two or more downlink carriers. Further, the at least one control message is coded with a selected coding scheme that is a coding scheme 1 (CS-1) or higher and the selected coding scheme is based at least in part on at least one predefined condition. An advantage of the present invention is that the downlink throughput for the mobile station operating in the Downlink Multi Carrier operation can be significantly increased by introducing a means for the mobile station to send one or more control messages, each with an increased Ack/Nack bitmap space, on an uplink carrier to the radio access network node.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIG. 3A1 shows the content of a radio block used for sending a RLC/MAC control message;

FIG. 4A1 shows the content of a radio block used for sending a RLC/MAC control message;

FIG. 5A1 shows the content of radio blocks used for sending a multi-segment RLC/MAC control message;

FIG. 6A1 shows the content of radio blocks used for sending multiple RLC/MAC control messages;

DETAILED DESCRIPTION

Figure 2A:
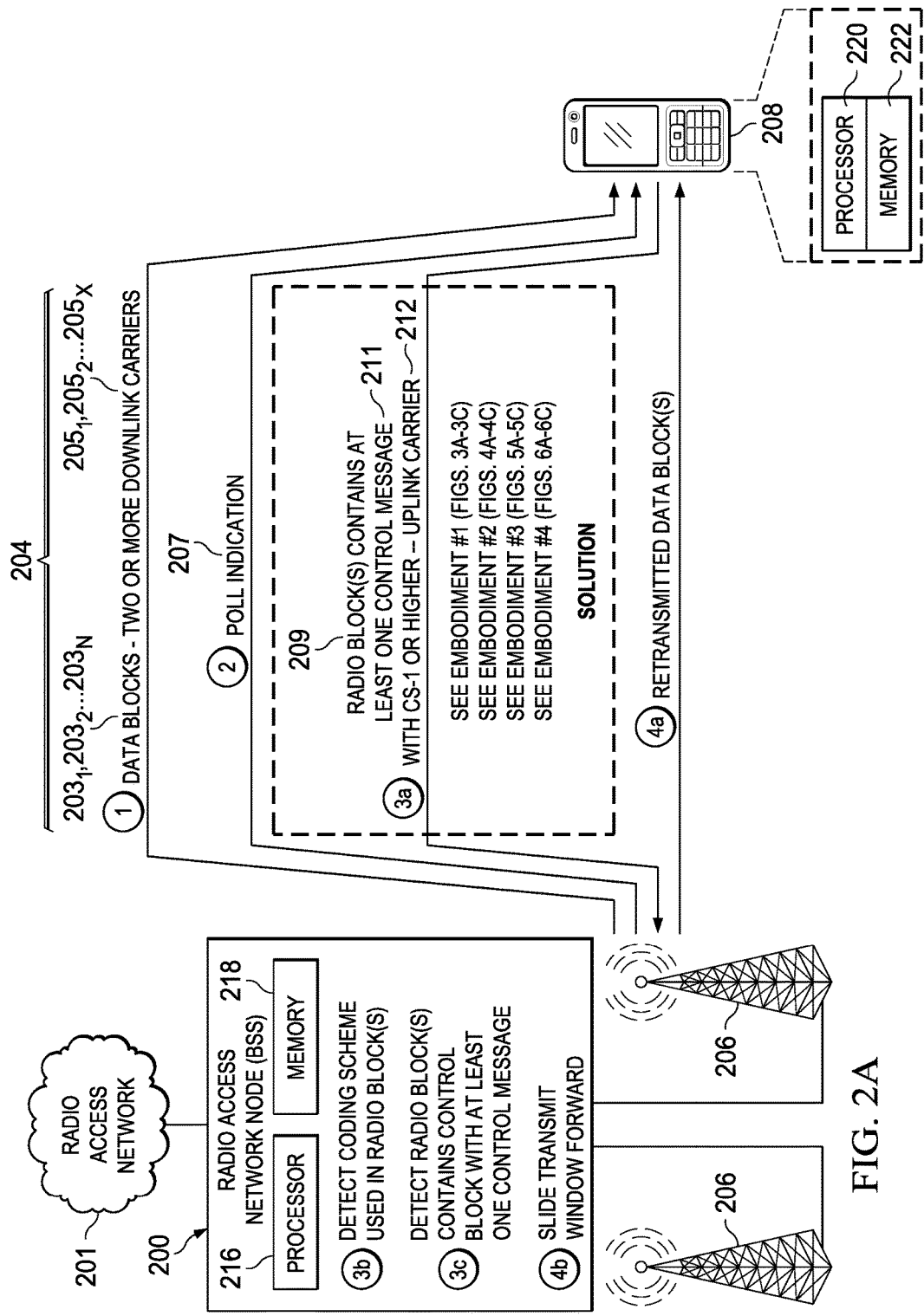
FIG. 2A is a basic system diagram showing a radio access network node (e.g., BSS) interacting with a MS (only one shown) utilizing the Downlink Multi Carrier mode in accordance with the present invention.

Referring to FIG. 2A, there is a basic diagram of a radio access network node 200 (e.g., BSS 200) which is coupled to a radio access network 201 and multiple BTSs 206 (only two shown) where the radio access network node 200 is shown interacting via one of the BTSs 206 over the GPRS radio interface 204 with a MS 208 (only one shown) utilizing the Downlink Multi Carrier operation in accordance with the present invention. Although the description provided herein is based on the BSS 200, the GPRS radio interface 204, the MS 208 being associated with the GERAN standard it should be appreciated that the present invention could be implemented by another type of radio access network node 200, radio interface 204 and MS 208 which are associated with other standards. Further, it should be appreciated that for clarity only the components and their associated functionalities which are needed to describe and enable the present invention have been described herein.

As shown, the BSS 200 sends data blocks $203_1$, $203_2$ ... $203_n$ using multiple downlink carriers $205_1$, $205_2$ ... $205_n$ (each downlink carrier is used to transmit one or more data blocks) during a radio block period to the MS 208 which utilizes a wideband receiver to receive the data blocks $203_1$, $203_2$ ... $203_n$ on multiple downlink carriers $205_1$, $205_2$ ... $205_x$ (see FIG. 2's step 1—note per DLMC there can be up to 16 downlink carriers). Further, the BSS 200 will send the MS 208 a poll indication 207 which triggers the MS 208 to send at least one radio block 209 which contains at least one control message 211 (e.g. at least one PDAN message 211) with CS-1 or higher on an uplink carrier 212 to the BSS 200 (see FIG. 2's steps 2 and 3a—note the poll indication 207 could be included in any of the data blocks $203_1$, $203_2$ ... $203_n$). The particular coding scheme CS-1, CS-2, CS-3 or higher which the MS 208 uses to generate the control message(s) 211 is based at least in part on at least one predefined condition (discussed in detail below). The control message(s) 211 contains at least one of acknowledgment information and non-acknowledgement information associated with a subset (all or a portion) of the data blocks $203_1$, $203_2$ ... $203_n$. Upon receiving the radio block(s) 209, the BSS 200 detects the coding scheme used in the received radio block(s) 209 and further detects whether the received radio block(s) 209 has control block(s) which contain the control message(s) 211 or payload (see FIG. 2's steps 3b and 3c which assume the received radio block(s) 209 contain the control message(s) 211). Thereafter, the BSS 200 upon determining that the control message(s) 211 contains non-acknowledgement information for one or more of the sent data blocks $203_1$ (for example) will resend the one or more data blocks $203_1$ (for example) which have not been correctly received to the MS 208 (see FIG. 2's step 4a). The BSS 200 upon determining that the control message(s) 211 contains acknowledgement information for all of the data blocks $203_1$, $203_2$, $203_3$ ... $203_{n-1}$ (for example) which indicates that the mobile station has correctly received all of the corresponding data blocks $203_1$, $203_2$, $203_3$ ... $203_{n-1}$ (for example) will slide a transmit window forward to reflect a next oldest data block $203_n$ that was sent but for which acknowledgment information has not yet been received in a control message from the MS 208 (see FIG. 2's step 4b). To enable all of this, the BSS 200 at least comprises at least one processor 216 and at least one memory 218 that stores processor-executable instructions, wherein the at least one processor 216 interfaces with the at least one memory 218 to execute the processor-executable instructions to implement at least the aforementioned steps 1, 2, 3a, 3b, 3c, 4a, and 4b. Likewise, MS 208 at least comprises at least one processor 220 and at least one memory 222 that stores processor-executable instructions, wherein the at least one processor 220 interfaces with the at least one memory 222 to execute the processor-executable instructions to implement at least the aforementioned steps 1, 2, 3a, and 4a.

Figure 2B:
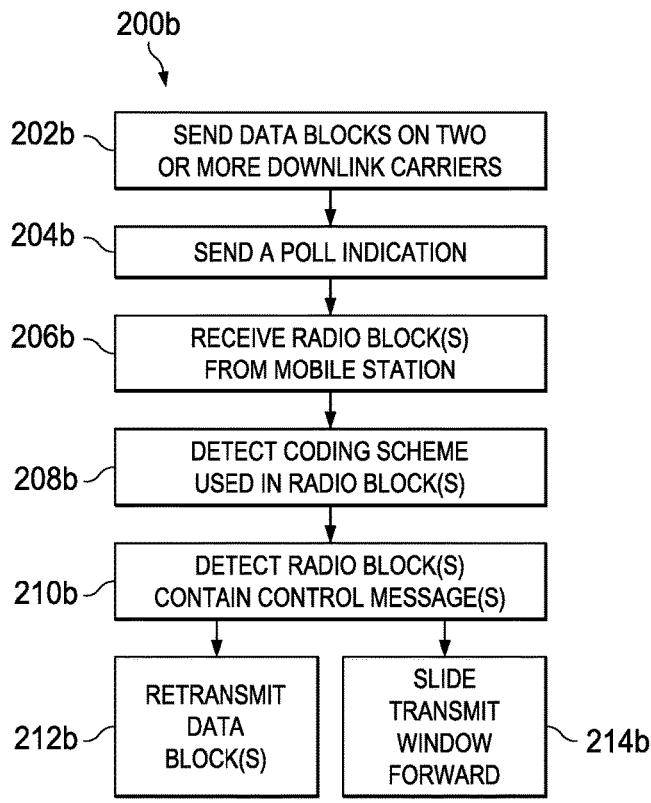
FIG. 2B is a flowchart illustrating a method implemented in the radio access network node in accordance with the present invention.

As shown in FIG. 2B, there is a flowchart illustrating a method 200b in the radio access network node 200 for receiving at least one control message 211 with increased space for acknowledgement information and non-acknowledgment information from the MS 208 in accordance with the present invention. At step 202b, the BSS 200 sends data blocks $203_1$, $203_2$ ... $203_n$ using multiple downlink carriers $205_1$, $205_2$ ... $205_x$ (each downlink carrier is used to transmit one or more data blocks) during a radio block period to the MS 208 which utilizes a wideband receiver to receive the data blocks $203_1$, $203_2$ ... $203_n$ on multiple downlink carriers $205_1$, $205_2$ ... $205_x$ (note: per DLMC there can be up to 16 downlink carriers). At step 204b, the BSS 200 will send the MS 208 a poll indication 207 which is a request for the MS 208 to send the control message(s) 211 which contain Ack/Nack information related to the data blocks $203_1$, $203_2$ ... $203_n$ (note: the poll indication 207 could be included in any of the data blocks $203_1$, $203_2$ ... $203_n$). At step 206b, the BSS 200 receives at least one radio block 209 from the MS 208. At steps 208b and 210b, the BSS 200 detects the coding scheme used in the received radio block(s) 209 and further detects whether the received radio block(s) 209 has control block(s) 213 which contain the control message(s) 211 or payload (see discussion below about exemplary ways that steps 208b and 210b can be performed). In this case, assume the BSS 200 receives at least one radio block 209 which contains not payload but at least one control message 211 (e.g. at least one PDAN message 211) with CS-1 or higher. At step 212b, the BSS 200 upon determining that the control message(s) 211 contains non-acknowledgement information for one or more data blocks $203_1$ (for example) will resend the one or more data blocks $203_1$ (for example) which have not been correctly received by the MS 208. At step 214b, the BSS 200 upon determining that the control message(s) 211 contains acknowledgement information for all of data blocks $203_1$, $203_2$, $203_3$ ... $203_{n-1}$ (for example) which indicates that the MS 208 has correctly received all of the corresponding data blocks $203_1$, $203_2$, $203_3$ ... $203_{n-1}$ (for example) will slide a transmit window forward to reflect a next oldest data block $203_n$ that was sent but for which acknowledgment information has not yet been received in a control message from the MS 208. In the case, where the control message(s) 211 contains the acknowledgement information for one or more of the sent data blocks which indicates that the MS 208 has correctly received the corresponding one or more data blocks including an oldest data block for which acknowledgment information has not yet been received, then the BSS 200 slides a transmit window forward to reflect the next oldest data block that was sent but for which acknowledgment information has not yet been received. As discussed above, the BSS 200 has the at least one processor 216 and at least one memory 218 that stores processor-executable instructions, wherein the at least one processor 216 interfaces with the at least one memory 218 to execute the processor-executable instructions to implement at least the aforementioned steps 202b, 204b, 206b, 208b, 210b, 212b and 214b.

Figure 2C:
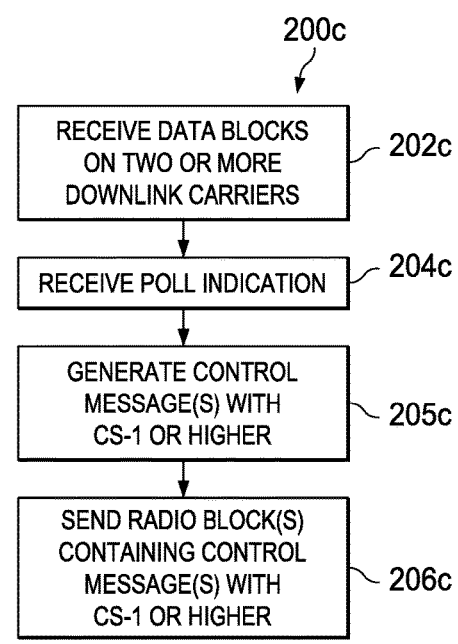
FIG. 2C is a flowchart illustrating a method implemented in the MS in accordance with the present invention.

As shown in FIG. 2C, there is a flowchart illustrating a method 200c in the MS 208 for sending at least one control message 211 with increased space for acknowledgement information and non-acknowledgment information to the radio access network node 200 in accordance with the present invention. At step 202c, the MS 208 receives data blocks $203_1$, $203_2$ ... $203_n$ sent on multiple downlink carriers $205_1$, $205_2$ ... $205_x$ (each downlink carrier is used to transmit one or more data blocks) during a radio block period from the radio access network node 200 (note: per DLMC there can be up to 16 downlink carriers). At step 204c, the MS 208 receives a poll indication 207 from the radio access network node 200 (note: the poll indication 207 could be included in any of the data blocks $203_1$, $203_2$ ... $203_n$). The poll indication 207 is a request for the MS 208 to send the control message(s) 211 which contain Ack/Nack information related to the data blocks $203_1$, $203_2$ ... $203_n$. At steps 205c and 206c, the MS 208 generates at least one control message 211 with CS-1 or higher and then sends at least one radio block 209 which contains the at least one control message 211 (e.g. at least one PDAN message 211) with CS-1 or higher to the radio access network node 200 on an uplink carrier 212 (note: the uplink carrier 212 corresponds to the downlink carrier on which the MS 208 received the data block providing the poll indication 207 or the poll indication 207 could indicate the uplink carrier 212 the MS 208 is to use for sending the control message(s) 211). The control message(s) 211 contains at least one of acknowledgment information and non-acknowledgement information associated with a subset (all or a portion) of the data blocks $203_1$, $203_2$ ... $203_n$. As discussed above, the MS 208 has the at least one processor 220 and the at least one memory 222 that stores processor-executable instructions, wherein the at least one processor 220 interfaces with the at least one memory 222 to execute the processor-executable instructions to implement at least the aforementioned steps 202c, 204c, and 206c.

Figure 1:
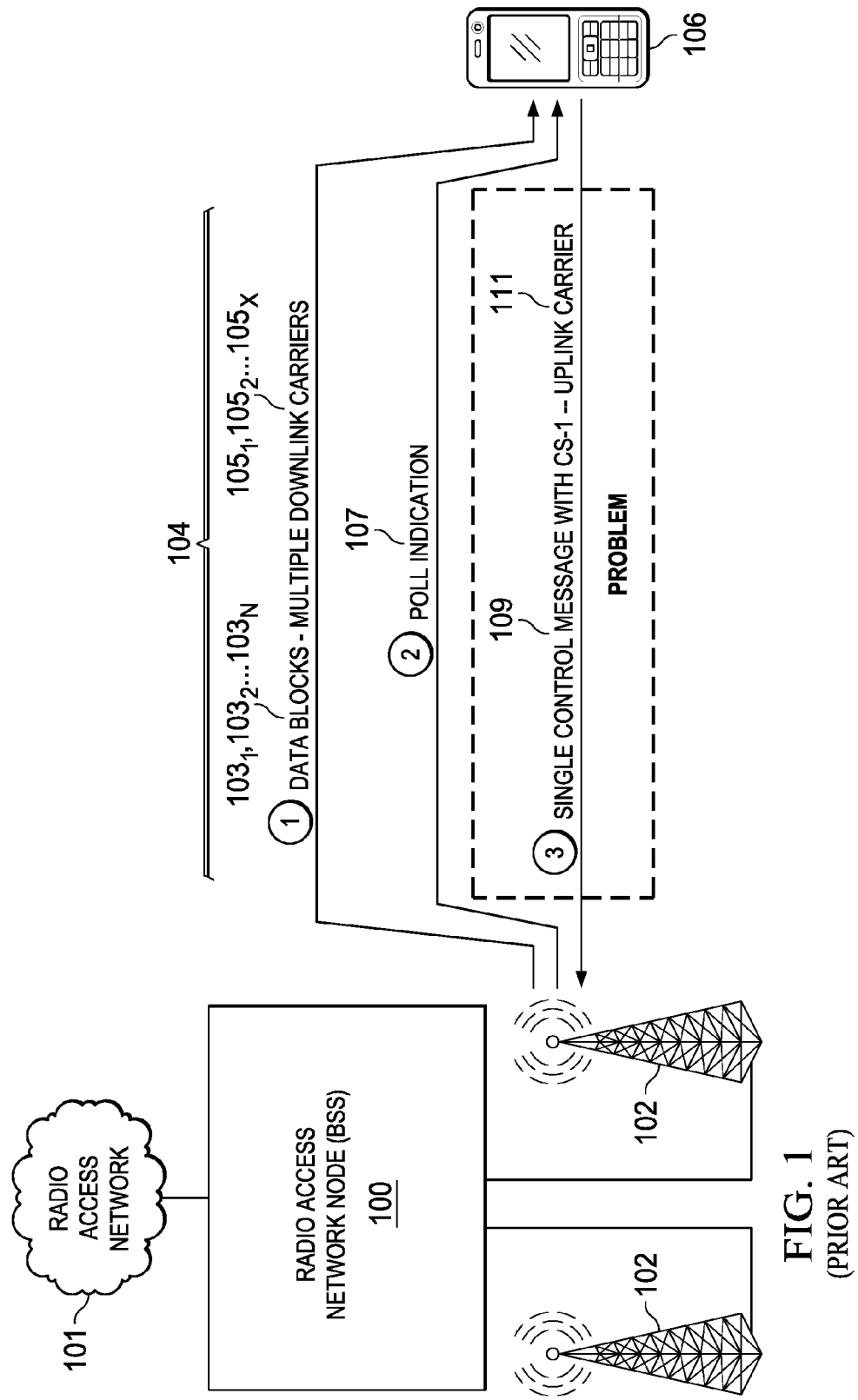
FIG. 1 (PRIOR ART) is a basic system diagram used to help explain the state-of-the-art and a problem associated therewith when a radio access network node (e.g., BSS) interacts with a MS (only one shown) utilizing a relatively new mode of operation called Downlink Multi Carrier which is being standardized within GERAN.

It should be appreciated that by configuring the control message(s) 211 to have a particular coding scheme that is CS-1, CS-2, CS-3 or higher depending on at least in part on one or more predefined conditions (discussed below) pursuant to the present invention is a marked improvement over the prior art in which the control message 109 always used the same coding scheme namely CS-1 (see FIG. 1). One advantage of implementing the present invention is that the increased rate at which the BSS 201 can send the data blocks $203_1$, $203_2$ ... $203_n$ using multiple downlink carriers $205_1$, $205_2$ ... $205_x$ per DLMC to the MS 208 can be balanced (or at least better balanced) by the rate at which the MS 208 acknowledges receipt of the data blocks $203_1$, $203_2$ ... $203_n$. In other words, to enable the acknowledgment throughput to scale (balance) with the rate at which data blocks $203_1$, $203_2$ ... $203_n$ are sent using carriers $205_1$, $205_2$ ... $205_x$ for an MS 208 in Downlink Multi Carrier mode the present invention effectively increases the size and/or the efficiency of the bitmap containing the acknowledgement information and non-acknowledgment information within the control message(s) 211 sent by the MS 208 in response to any given poll indication 207 (a request for Ack/Nack information which relates to data blocks $203_1$, $203_2$ ... $203_n$ sent on the downlink by the network). This can be achieved by using anyone or a combination of the following different embodiments:

1. Network controlled choice of higher numbered coding scheme: Dynamically let the radio access network node 200 command the MS 208 as to what coding scheme to use for sending control message(s) 211 (e.g., PDAN(s) 211). The commanded coding scheme could either be a fixed coding scheme or an indication of the highest coding scheme allowed to be used. The first embodiment is discussed in more detail below with respect to FIGS. 3A-3C.

2. MS 208 controlled choice of higher numbered coding scheme: Dynamically allow the MS 208 to send the control message(s) 211 (e.g., PDAN(s) 211) with higher coding schemes than the currently allowed CS-1. For example, this can be achieved by allowing the MS 208 to generate control message(s) 211 that are coded using CS-2, CS-3 or higher when a larger bitmap that can fit into a CS-1 coded control message is needed in an attempt to match the rate at which data blocks $203_1$, $203_2$ ... $203_n$ are being received with the rate at which they are being acknowledged (recall: the legacy control message 109 always used a CS-1 scheme). In this case, the MS 208 would be in control (or partly in control) of the chosen coding scheme, and the radio access network node 200 (e.g., BSS 200) needs to detect the coding scheme used in the control message(s) 211. The second embodiment is discussed in more detail below with respect to FIGS. 4A-4C.

3. Multi-segmented control message 211: Allow the MS 208 to respond with a multi-segmented control message 211 (e.g., multi-segmented PDAN 211) as a response to a single poll indication 207 where each multi-segmented control message 211 can be sent using one or more of the timeslots assigned on the uplink carrier 212 corresponding to the downlink carrier on which it was polled by the radio access network node 200 (e.g., BSS 200). The multi-segmented control message 211 may be sent with CS-1 or any higher coding scheme. The third embodiment is discussed in more detail below with respect to FIGS. 5A-5C.

4. Multiple control messages 211 per poll: Allow the MS 208 to send multiple control messages 211 (e.g., multiple PDANs 211) as a response to a single poll indication 207. Each such control message 211 may be sent with a CS-1 or any higher coding scheme. The fourth embodiment is discussed in more detail below with respect to FIGS. 6A-6C.

Note: An appendix has been provided below to describe in more detail the different GPRS coding schemes CS-1, CS-2, CS-3, CS-4 etc. Basically, in the present invention the lower the coding scheme used such as CS-1 then the less Ack/Nack information which can be included in the control message(s) 211 but the better the chance of a proper reception by the radio access network node 200. Whereas, the higher the coding scheme used such as CS-4 then the more Ack/Nack information which can be included in the control message(s) 211 but the less the chance of a proper reception by the radio access network node 200.

Figure 3A:
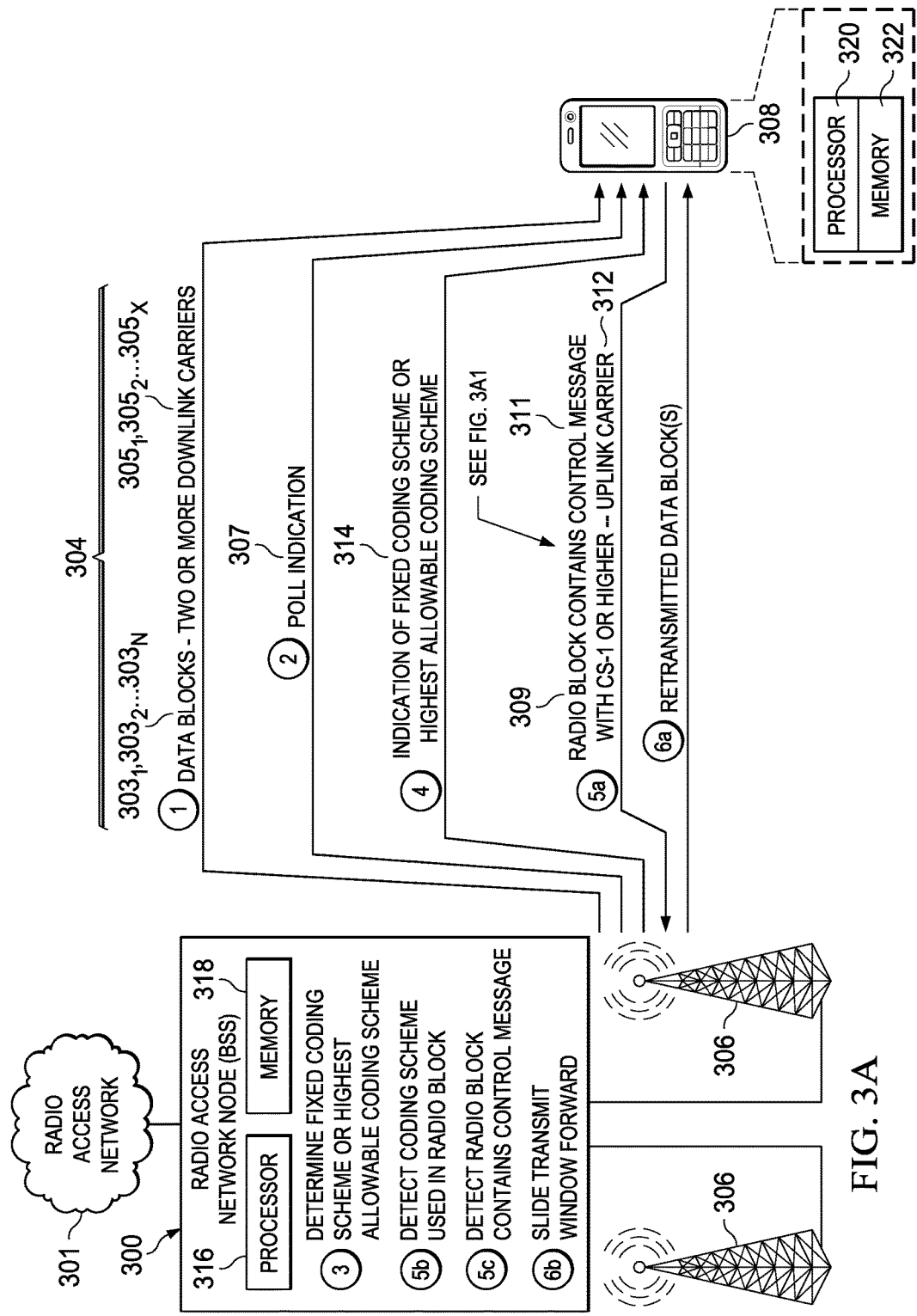
FIG. 3A is a basic system diagram showing a radio access network node (e.g., BSS) interacting with a MS (only one shown) utilizing the Downlink Multi Carrier mode in accordance with a first embodiment of the present invention.
Figure 3B:
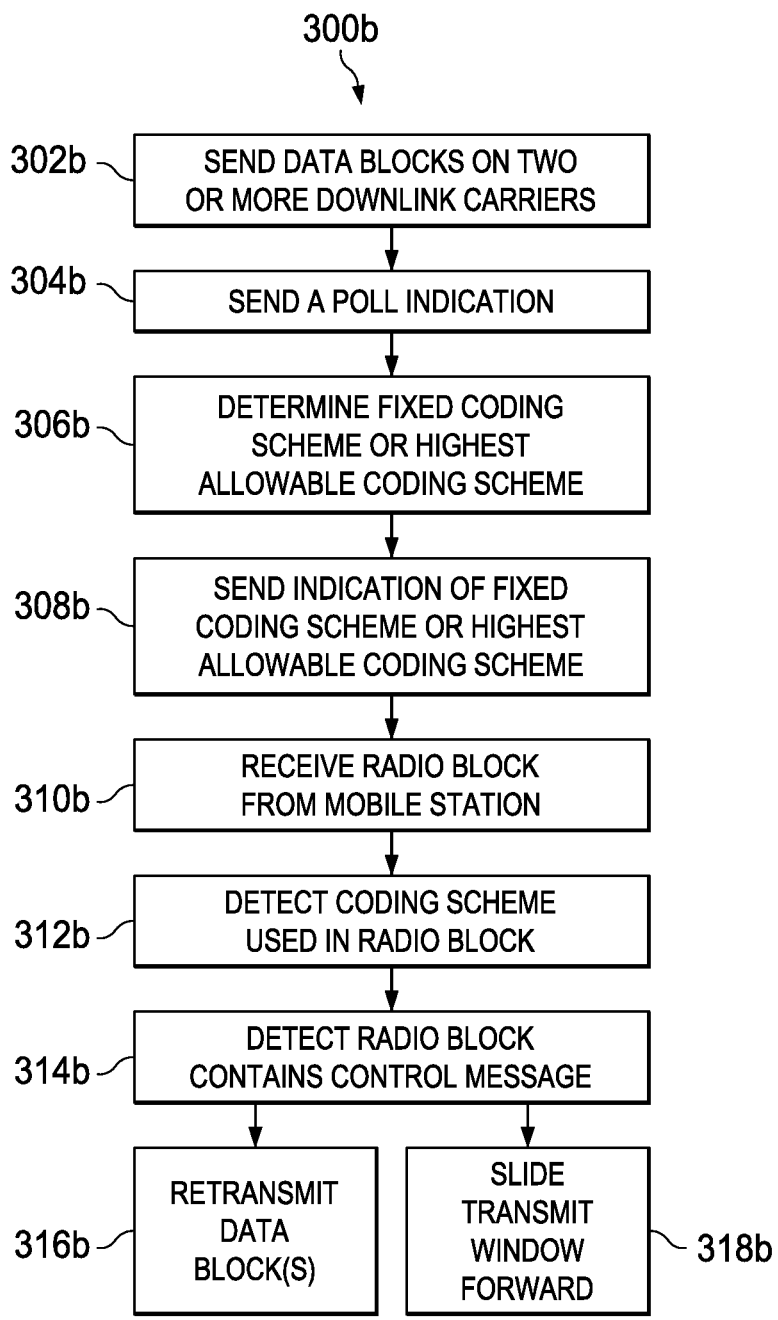
FIG. 3B is a flowchart illustrating a method implemented in the radio access network node in accordance with the first embodiment of the present invention.
Figure 3C:
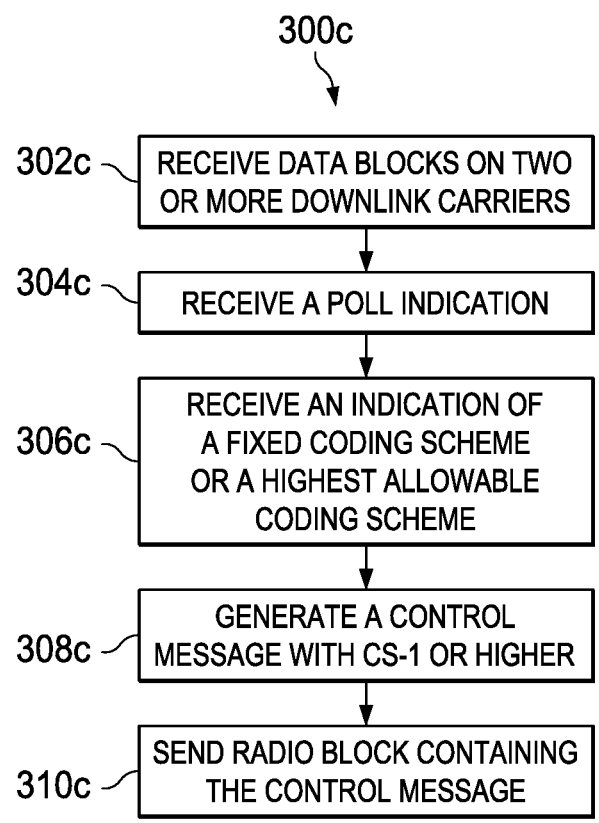
FIG. 3C is a flowchart illustrating a method implemented in the MS in accordance with the first embodiment of the present invention.

Referring to FIGS. 3A-3C, there are diagrams respectively illustrating a basic system where the radio access network node 300 (e.g., BSS 300) is interacting with the MS 308, a method 300b implemented by the radio access network node 300, and a method 300c implemented by the MS 308 in accordance with the first embodiment of the present invention. Although the description provided herein is based on the BSS 300, the GPRS radio interface 304, the MS 308 being associated with the GERAN standard it should be appreciated that the present invention could be implemented by another type of radio access network node 300, radio interface 304 and MS 308 which are associated with other standards. Further, it should be appreciated that for clarity only the components and their associated functionalities which are needed to describe and enable the present invention have been described herein.

As shown in FIG. 3A, the BSS 300 is coupled to the radio access network 301 and multiple BTSs 306 (only two shown) where the BSS 300 interacts via one of the BTSs 306 over the GPRS radio interface 304 with the MS 308 (only one shown) utilizing the Downlink Multi Carrier operation. More specifically, the BSS 300 sends data blocks $303_1$, $303_2$ ... $303_n$ using multiple downlink carriers $305_1$, $305_2$ ... $305_x$ (each downlink carrier is used to transmit one or more data blocks) during a radio block period to the MS 308 which utilizes a wideband receiver to receive the data blocks $303_1$, $303_2$ ... $303_n$ on multiple downlink carriers $305_1$, $305_2$ ... $305_x$ (see FIG. 3A's step 1—note per DLMC there can be up to 16 downlink carriers). Further, the BSS 300 sends the MS 308 a poll indication 307 which is a request for the MS 308 to send the control message(s) 311 which contain Ack/Nack information related to data blocks $303_1$, $303_2$ ... $303_n$ (see FIG. 3A's step 2)(note: the poll indication 307 could be included in any of the data blocks $303_1$, $303_2$ ... $303_n$).

In addition, the BSS 300 determines, based in part on at least on one or more predefined conditions, a fixed coding scheme or a highest allowable coding scheme that the MS 308 can use to generate the control message(s) 311 (see FIG. 3A's step 3). The BSS 300 sends an indication 314 of the determined fixed coding scheme or the highest allowable coding scheme to the MS 308 (see FIG. 3A's step 4—note 1: a detail discussion on some exemplary ways the BSS 300 can perform steps 3 and 4 are provided below and note 2: steps 3 and 4 can be performed at any time even before steps 1 and 2). The MS 308 sends at least one radio block 309 which contains at least one control message 311 (e.g. at least one PDAN message 311) with CS-1 or higher on an uplink carrier 312 to the BSS 300 (see FIG. 3A's step 5a) (note: the uplink carrier 312 can correspond to the downlink carrier on which it received the data block providing the poll indication 307 or the poll indication 307 could indicate the uplink carrier 312 the MS 208 is to use for sending the control message(s) 311). The particular coding scheme CS-1, CS-2, CS-3 or higher which the MS 308 uses to generate the control message(s) 311 is based at least in part on the indication 314. For instance, if the indication 314 is the fixed coding scheme then the MS 308 uses that fixed coding scheme to generate the control message(s) 311. If the indication 314 is the highest allowable coding scheme then the MS 308 can use at least one predefined condition (discussed in detail below with respect to the second embodiment) to determine the particular coding scheme to use when generating the control message(s) 311 as long as that particular coding scheme is not higher than the highest allowable coding scheme. In any case, the control message(s) 311 contains at least one of acknowledgment information and non-acknowledgement information associated with a subset (all or a portion) of the data blocks $303_1$, $303_2$ ... $303_n$. FIG. 3A1 is a block diagram illustrating an exemplary radio block 309 which comprises a control block 313 with a MAC header 315, one control message 311 (RLC/MAC control message 311—with Ack/Nack information) and a BCS field 317.

Upon receiving the radio block(s) 309, the BSS 300 detects the coding scheme used in the received radio block(s) 309 and further detects whether the received radio block(s) 309 has control block(s) 313 which contain the control message(s) 311 or payload (see FIG. 3A's steps 5b and 5c which assume the received radio block(s) 309 contain the control message(s) 311). Thereafter, the BSS 300 upon determining that the control message(s) 311 contains non-acknowledgement information for one or more data blocks $303_1$ (for example) will resend the one or more data blocks $303_1$ (for example) which have not been correctly received to the MS 308 (see FIG. 3A's step 6a). The BSS 300, upon determining that the control message(s) 311 contains acknowledgement information for all of the data blocks $303_1$, $303_2$, $303_3$ ... $303_{n-1}$ (for example) which indicates that the MS 308 has correctly received all of the corresponding data blocks $303_1$, $303_2$, $303_3$ ... $303_{n-1}$ (for example), will slide a transmit window forward to reflect a next oldest data block $303_n$ that was sent but for which acknowledgment information has not yet been received in a control message from the MS 308 (see FIG. 3A's step 6b). In the case, where the control message(s) 311 contains the acknowledgement information for one or more of the sent data blocks which indicates that the MS 308 has correctly received the corresponding one or more data blocks including an oldest data block for which acknowledgment information has not yet been received, then the BSS 300 slides a transmit window forward to reflect the next oldest data block that was sent but for which acknowledgment information has not yet been received. To enable all of this, the BSS 300 at least comprises at least one processor 316 and at least one memory 318 that stores processor-executable instructions, wherein the at least one processor 316 interfaces with the at least one memory 318 to execute the processor-executable instructions to implement at least the aforementioned steps 1, 2, 3, 4, 5a, 5b, 5c, 6a, and 6b. Likewise, MS 308 at least comprises at least one processor 320 and at least one memory 322 that stores processor-executable instructions, wherein the at least one processor 320 interfaces with the at least one memory 322 to execute the processor-executable instructions to implement at least the aforementioned steps 1, 2, 4, 5a, and 6a.

The following is a discussion which explains in more detail some of the aforementioned steps and additional features associated with the first embodiment of the present invention. First, it should be appreciated that by allowing the MS 308 to send control message(s) 311 (e.g., PDAN(s) 311) with higher numbered coding schemes effectively means there is lower protection of the actual control message(s) 311 itself thus a higher chance for it to be received with one or more errors in which case it will not be further processed by the BSS 300. As such, it is desirable that the choice of coding scheme is under the control of the radio access network node 300. The choice of the highest allowed coding scheme (or fixed coding scheme) to be used can be based in part on one or more predefined conditions such as, for example, the received uplink signal level in view of predefined thresholds, estimated bit error rate probability (BEP) in view of predefined thresholds, and estimated block error rate probability (BLEP) in view of predefined thresholds. For example, if the BEP detected by the BSS 300 is below a first threshold then the BSS 300 can send an indication 314 to the MS 308 indicating that the highest allowable coding scheme is CS-4 and if the BEP is detected to be between the first threshold and a higher second threshold then the BSS 300 can similarly indicate to the MS 308 that it is to use CS-3 and so on. Further, although the radio condition (e.g. low BEP and BLEP) detected by the BSS 300 may allow for a higher coding scheme to be used, this might not be needed if the transmission rate on the downlink is low enough. In other words, the choice of maximum coding scheme used on the uplink for the control message(s) 311 could also be based on the rate at which the MS 308 is receiving new data blocks on its assigned downlink carriers $305_1, 305_2 \ldots 305_x$.

The coding scheme that the MS 308 should or must use for the uplink control message(s) 311 (e.g., PDAN(s) 311), when in DLMC operation, could be signaled (via indication 314) to the MS 308 during an ongoing data transfer (see FIG. 3A's step 4). The realization of such signaling is exemplified below, but not limited to:

- Using reserved values of the length indicator in the GPRS and EGPRS downlink RLC data blocks. The reserved values could be used to indicate that a given coding scheme should be used for uplink control messages, e.g., a Length Indicator of 122 could indicate CS-2 and a length indicator of 121 could indicate CS-3 etc. . . . .
- Using a reserved Length Indicator value to indicate that the next octet contains the commanded coding scheme. For example if the Length Indicator is value X, where X is one of the currently reserved values, then this means that the octet immediately following the octet with Length Indicator=X contains the commanded coding scheme.
- Including in a Packet Uplink Ack/Nack (which will be sent by the network for the case where there is an ongoing uplink TBF operating in acknowledged mode) a "control channel coding command" indicating which modulation and coding scheme to use (or the highest than can be used) for the control message(s) 311 sent by the MS 308 in the uplink.
- Including in a piggy backed Ack/Nack (PAN) field (which is something that can be sent by the network for the case where there is an ongoing uplink TBF operating in acknowledged mode) a control channel coding command indicating which modulation and coding scheme to use (or the highest that can be used) for control message(s) 311 sent by the MS 308 in the uplink. The piggy backed Ack/Nack field is sent using bit space resources within a downlink data block having data payload addressed to a MS that may be different from MS 308 (i.e. in which case the PAN field is considered to be piggy-backed). In this case, there is a need for the MS 308 to detect that the content of the PAN no longer only contains an Ack/Nack bitmap, but also (or instead) detect the presence of a control channel coding command. To allow for detection of different type of PANs a new CRC code could be defined for the receiver (MS 308). Alternatively, a new bit could be added to the TFI value currently XORed with the CRC bits. For instance, a TFI value of [0,1,1,1,1] could be supplemented with a new bit (i.e. a $6^{th}$ bit) to indicate whether the legacy PAN definition or new (with control channel coding command) PAN definition applies, e.g. [1,0,1, 1,1,1] can be XORed with the CRC bits to indicate a PAN field sent to a MS assigned the TFI value of [0,1,1,1,1] is to use CS-3 coded PDAN messages.
- Defining a new PACCH message to carry the commanded coding scheme.
- Re-defining bits within the RLC/MAC header to include the commanded coding scheme.
- Defining the coding scheme to be used for the PDANs as a function of the commanded uplink coding scheme used for sending uplink data payload. In this case, there is a pre-requisite which is the existence of an uplink TBF.
- Defining the coding scheme to be used for the PDANs as a function of the coding scheme used for payload on the downlink.
- A combination of the above.

The following is a discussion about different ways that the radio access network node 300 can perform steps 5*b* and 5*c* to detect that a control block has been transmitted in a given uplink radio block with a specific MCS coding scheme and thereby conclude that data payload has not been transmitted in that MCS coded uplink radio block. For instance, the CPS (coding and puncturing scheme indicator) field can be used to identify the MCS used for the transmitted control block (see the aforementioned 3GPP TS 44.060 for details about the location of the CPS field within the EGPRS Uplink RLC/MAC header). It should be noted that the use of the CPS field to identify the control block sent using MCS cannot be done for all EGPRS/EGPRS2-A MCSs due to lack of code-points. However, it is only MCS-5/6 and UAS-10/11 that lack this feature. Alternative ways to allow the radio access network node 300 to perform steps 5*a* and 5*b* to identify the MCS used by the MS 308 for transmission of the control message 311 include but are not limited to:

- Re-definition of the stealing flag (SF) bits: Additional code points can be added to the existing code points. Since the radio access network node 300 expects the poll response (PDAN) from a MS 308 supporting DLMC in a specific uplink radio block, introducing a new SF code point will ensure there is no confusion when identifying if a data block or a control message 311 has been received in that MCS coded uplink radio block.
- Using a newly defined CRC code: This allows the radio access network node 300 to detect whether a data block or a control message 311 has been received in a specific uplink radio block the network has indicated the MS 308 is to use for sending a poll response. It should pose little additional computational complexity to the radio access network node 300 since the same demodulation and channel decoding is applied irrespective of the CRC code used.
- XOR a pre-defined bit sequence to the currently defined CRC code: This allows a simple implementation at the MS 308 to apply an XOR operation with a pre-defined bit sequence. When receiving the radio block 309, the radio access network node 300 attempts to decode the radio block 309 without using the pre-defined XORed bit sequence, and if this fails, then attempts to decode the radio block 309 by using the pre-defined XORed bit sequence.

In one example, the radio network access node 300 can implement steps 5*b* and 5*c* as follows:

I. A radio block 309 is received.

II. The modulation of the radio block 309 is blindly detected.

III. The radio block 309 is demodulated and the corresponding stealing flags are decoded to determine the header type thereby allowing the MS 308 to know where to look for the RLC/MAC header 315. The RLC/MAC header 315 is decoded and the CPS field therein is examined to determine the MCS used (i.e. which of MCS-1 through MCS-9 has been used) for the radio block.

IV. Option 1 for determining if a control block is present:
 a. Here another stealing flag could be used which indicates for instance "It is the same block structure commonly used for sending data payload but it includes a control block and not payload".

V. Option 2 for determining if a control block is present:
   a. If a new CRC is defined the radio access network node 300 will try both CRC polynomials and one will indicate "legacy block structure for sending data payload" and the other one (i.e. the new one) will indicate "legacy block structure for sending a control block".

VI. Option 3 for determining if a control block is present:
   a. The XORing of a subset of the parity bits in the RLC/MAC header 315 with an all 1's bit pattern can be used to implicitly signal information. In this case no XORing would indicate a "legacy block structure for sending data payload" and XORing of a predetermined bit pattern would indicate a "legacy block structure for sending a control block".

VII. Option 4 for determining if a control block is present:
   a. If there are available code points in the CPS field, one could for example have a new CPS field definition indicating "MCS-6 block, puncturing scheme 1, control block".

The radio access network node 300 can use either one of the above techniques IVa, Va, VIa, or VIIa to determine what MCSs has been used for the control block 311 and the type of payload which has been received either the control message 311 (e.g., PDAN message 311) or payload data.

As shown in FIG. 3B, there is a flowchart illustrating a method 300b in the radio access network node 300 for receiving at least one control message 311 with increased space for acknowledgement information and non-acknowledgment information from the MS 308 in accordance with the first embodiment of the present invention. At step 302b, the BSS 300 sends data blocks $303_1$, $303_2$ . . . $303_n$ using multiple downlink carriers $305_1$, $305_2$ . . . $305_x$ (each downlink carrier is used to transmit one or more data blocks) during a radio block period to the MS 308 which utilizes a wideband receiver to receive the data blocks $303_1$, $303_2$ . . . $303_n$ on multiple downlink carriers $305_1$, $305_2$ . . . $305_x$ (note: per DLMC there can be up to 16 downlink carriers). At step 304b, the BSS 300 sends the MS 308 a poll indication 307 which is a request for the MS 308 to send the control message(s) 311 which contain Ack/Nack information related to data blocks $303_1$, $303_2$ . . . $303_n$ (note: the poll indication 307 could be included in any of the data blocks $303_1$, $303_2$ . . . $303_n$). At step 306b, the BSS 300 determines based in part at least on one or more predefined conditions a fixed coding scheme or a highest allowable coding scheme that the MS 308 can use to generate the control message(s) 311 (see discussion above for exemplary ways that step 306b can be performed). At step 308b, the BSS 300 sends an indication 314 of the determined fixed coding scheme or the highest allowable coding scheme to the MS 308 (note: steps 306b and 308b can be performed at any time even before steps 302b and 304b). At step 310b, the BSS 300 receives at least one radio block 309 from the MS 308. At steps 312b and 314b, the BSS 300 detects the coding scheme used in the received radio block(s) 309 and further detects whether the received radio block(s) 309 has control block(s) 313 which contain the control message(s) 311 or payload (see discussion above about exemplary ways that steps 312b and 314b can be performed). In this case, assume the BSS 300 receives at least one radio block 309 which contains not payload but at least one control message 311 (e.g. at least one PDAN message 311) with CS-1 or higher. At step 316b, the BSS 300 upon determining that the control message(s) 311 contains non-acknowledgement information for one or more data blocks $303_1$ (for example) will resend the one or more data blocks $303_1$ (for example) which have not been correctly received by the MS 308. At step 318b, the BSS 300 upon determining that the control message(s) 311 contains acknowledgement information for all of the data blocks $303_1$, $303_2$, $303_3$ . . . $303_{n-1}$ (for example) which indicates that the MS 308 has correctly received all of the corresponding data blocks $303_1$, $303_2$, $303_3$ . . . $303_{n-1}$ (for example) will slide a transmit window forward to reflect a next oldest data block $303_n$ that was sent but for which acknowledgment information has not yet been received in a control message from the MS 308. In the case, where the control message(s) 311 contains the acknowledgement information for one or more of the sent data blocks which indicates that the MS 308 has correctly received the corresponding one or more data blocks including an oldest data block for which acknowledgment information has not yet been received, then the BSS 300 slides a transmit window forward to reflect the next oldest data block that was sent but for which acknowledgment information has not yet been received. As discussed above, the BSS 300 has the at least one processor 316 and the at least one memory 318 that stores processor-executable instructions, wherein the at least one processor 316 interfaces with the at least one memory 318 to execute the processor-executable instructions to implement at least the aforementioned steps 302b, 304b, 306b, 308b, 310b, 312b, 314b, 316b, and 318b.

As shown in FIG. 3C, there is a flowchart illustrating a method 300c in the MS 308 for sending at least one control message 311 with increased space for acknowledgement information and non-acknowledgment information to the radio access network node 300 in accordance with the first embodiment of the present invention. At step 302c, the MS 308 receives data blocks $303_1$, $303_2$ . . . $303_n$ sent on multiple downlink carriers $305_1$, $305_2$ . . . $305_x$ (each downlink carrier is used to transmit one or more data blocks) during a radio block period from the radio access network node 300 (note: per DLMC there can be up to 16 downlink carriers). At step 304c, the MS 308 receives a poll indication 307 from the radio access network node 300 (note: the poll indication 307 could be included in any of the data blocks $303_1$, $303_2$ . . . $303_n$). The poll indication 307 is a request for the MS 308 to send the control message(s) 311 which contain Ack/Nack information related to data blocks $303_1$, $303_2$ . . . $303_n$. At step 306c, the MS 308 receives an indication 314 of the determined fixed coding scheme or the highest allowable coding scheme from the radio access network node 300 (note: step 306c can be performed at any time even before step 302c). At step 308c, the MS 308 generates at least one radio block 309 which contains at least one control message 311 (e.g. at least one PDAN message 311) with CS-1 or higher. The particular coding scheme CS-1, CS-2, CS-3 or higher which the MS 308 uses to generate the control message(s) 311 is based at least in part on the indication 314. For instance, if the indication 314 is the fixed coding scheme then the MS 308 uses that fixed coding scheme to generate the control message(s) 311. If the indication 314 is the highest allowable coding scheme then the MS 308 can use at least one predefined condition (discussed in detail below with respect to the second embodiment) to determine the particular coding scheme to use when generating the control message(s) 311 so long as that particular coding scheme is not higher than the highest allowable coding scheme. In any case, the control message(s) 311 contains at least one of acknowledgment information and non-acknowledgement information associated with a subset (all or a portion) of the data blocks $303_1$, $303_2$ . . . $303_n$. At step 310c, the MS 308 sends the at least one radio block 309 which contains at least one control message 311 (e.g. at least one PDAN message 311) with CS-1 or higher on an uplink carrier 312 to the radio access network node 300. As discussed above, the MS 308 has the at least one processor 320 and the at least one memory 322 that stores processor-executable instructions, wherein the at least one processor 320 interfaces with the at least one memory 322 to execute the processor-executable instructions to implement at least the aforementioned steps 302c, 304c, 306c, 308c, and 310c.

Figure 4A:
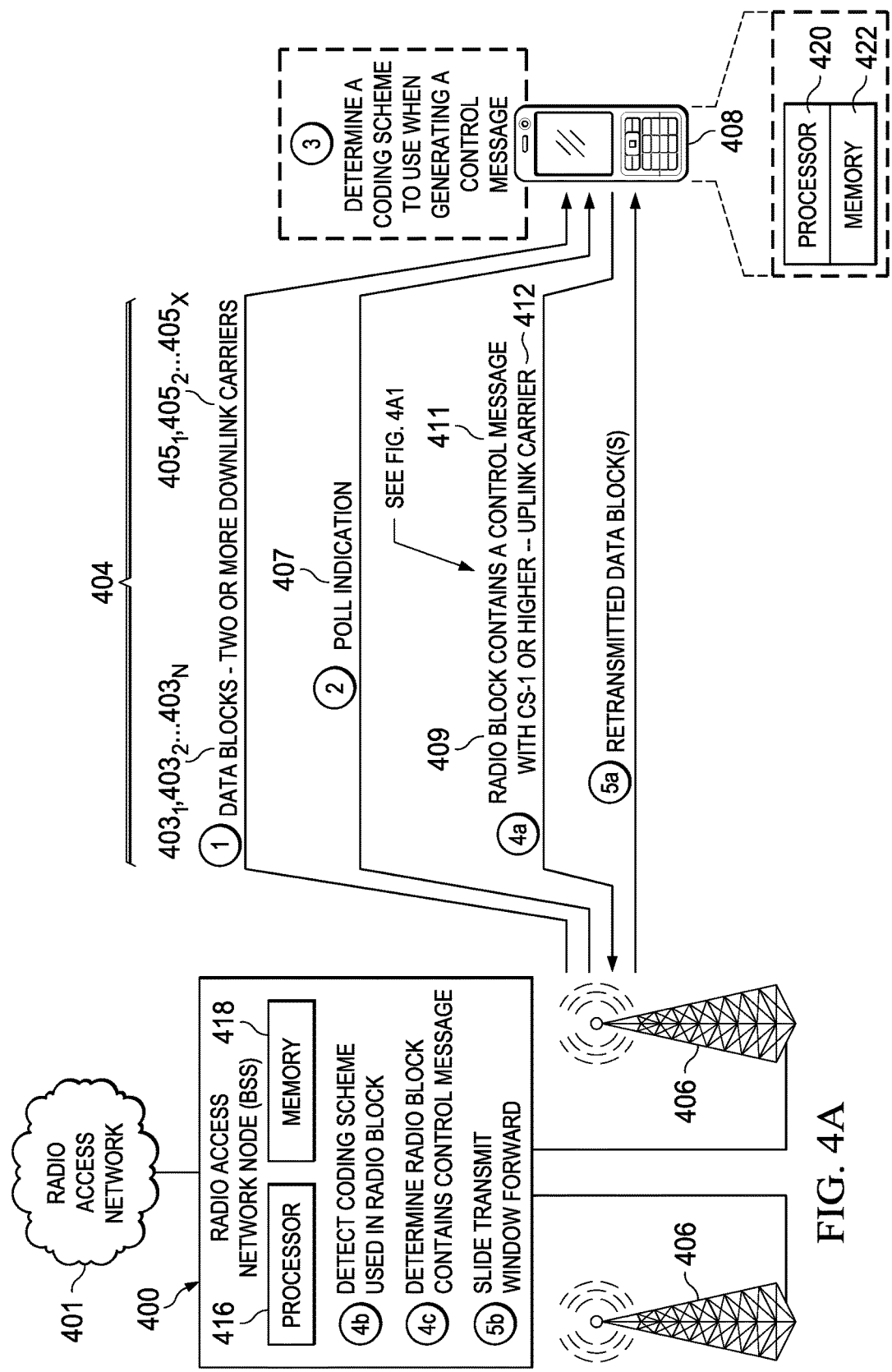
FIG. 4A is a basic system diagram showing a radio access network node (e.g., BSS) interacting with a MS (only one shown) utilizing the Downlink Multi Carrier mode in accordance with a second embodiment of the present invention.
Figure 4B:
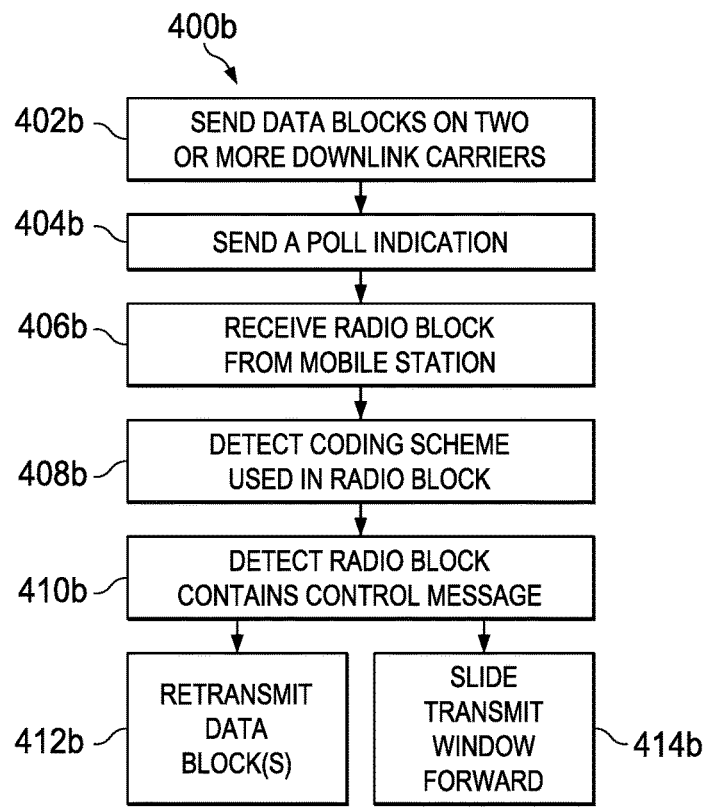
FIG. 4B is a flowchart illustrating a method implemented in the radio access network node in accordance with the second embodiment of the present invention.
Figure 4C:
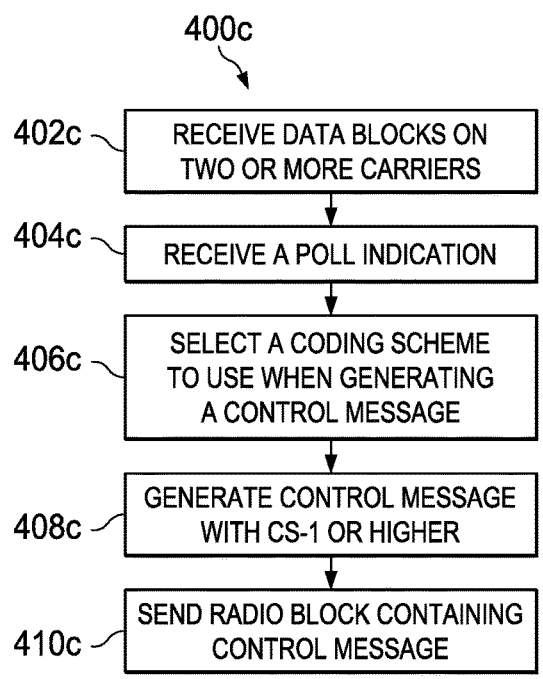
FIG. 4C is a flowchart illustrating a method implemented in the MS in accordance with the second embodiment of the present invention.

Referring to FIGS. 4A-4C, there are diagrams respectively illustrating a basic system where the radio access network node 400 (e.g., BSS 400) is interacting with the MS 408, a method 400b implemented by the radio access network node 400, and a method 400c implemented by the MS 408 in accordance with the second embodiment of the present invention. Although the description provided herein is based on the BSS 400, the GPRS radio interface 404, the MS 408 being associated with the GERAN standard it should be appreciated that the present invention could be implemented by another type of radio access network node 400, radio interface 404 and MS 408 which are associated with other standards. Further, it should be appreciated that for clarity only the components and their associated functionalities which are needed to describe and enable the present invention have been described herein.

As shown in FIG. 4A, the BSS 400 is coupled to the radio access network 401 and multiple BTSs 406 (only two shown) where the BSS 400 interacts via one of the BTSs 406 over the GPRS radio interface 404 with the MS 408 (only one shown) utilizing the Downlink Multi Carrier operation. More specifically, the BSS 400 sends data blocks $403_1$, $403_2$ . . . $403_n$ using multiple downlink carriers $405_1$, $405_2$ . . . $405_x$ (each downlink carrier is used to transmit one or more data blocks) during a radio block period to the MS 408 which utilizes a wideband receiver to receive the data blocks $403_1$, $403_2$ . . . $403_n$ on multiple downlink carriers $405_1$, $405_2$ . . . $405_x$ (see FIG. 4A's step 1—note per DLMC there can be up to 16 downlink carriers). Further, the BSS 400 sends the MS 408 a poll indication 407 which is a request for the MS 408 to send the control message(s) 411 which contain Ack/Nack information related to data blocks $403_1$, $403_2$ . . . $403_n$ (note: the poll indication 407 could be included in any of the data blocks $403_1$, $403_2$ . . . $403_n$). In addition, the MS 408 selects based in part at least on one or more predefined conditions a particular coding scheme which is to be used to generate the control message(s) 411 (see FIG. 4A's step 3). For instance, the MS 408 can select the particular coding scheme based at least in part on at least one of the following predefined condition(s): (1) a coding scheme indication 314 received from the radio access network node 400 (see discussion above related to the first embodiment of the present invention); (2) an estimated uplink channel quality based on reception of the downlink data blocks $403_1$, $403_2$ . . . $403_n$; and (3) avoid the use of a coding scheme that is higher than what is required by the acknowledgment information and the non-acknowledgment information to be conveyed in the control message(s) 411. Thereafter, the MS 408 sends at least one radio block 409 which contains at least one control message 411 (e.g. at least one PDAN message 411) with CS-1 or higher on an uplink carrier 412 to the BSS 400 (see FIG. 4A's step 4a) (note: the uplink carrier 412 can correspond to the downlink carrier on which the MS 408 received the data block providing the poll indication 407 or the poll indication 407 could indicate the uplink carrier 412 the MS 408 is to use for sending the control message(s) 411). The control message(s) 411 contain acknowledgment information and non-acknowledgment information associated with a subset (all or a portion) of the data blocks $403_1$, $403_2$ . . . $403_d$ FIG. 4A1 is a block diagram illustrating an exemplary radio block 409 which comprises a control block 413 with a MAC header 415, one control message 411 (RLC/MAC control message 411—with Ack/Nack information) and a BCS field 417.

Upon receiving the radio block(s) 409, the BSS 400 detects the coding scheme used in the received radio block(s) 409 and further detects whether the received radio block(s) 409 has control block(s) 413 which contain the control message(s) 411 or data payload (see FIG. 4A's steps 4b and 4c which assume the received radio block(s) 409 contain the control message(s) 411) (see discussion above with respect to the first embodiment for an explanation about different exemplary ways that the BSS 400 can perform steps 4b and 4c). Thereafter, the BSS 400 upon determining that the control message(s) 411 contains non-acknowledgement information for one or more data blocks $403_1$ (for example) will resend the one or more data blocks $403_1$ (for example) which have not been correctly received by the MS 408 (see FIG. 4A's step 5a). The BSS 400 upon determining that the control message(s) 411 contains acknowledgement information for all of the data blocks $403_1$, $403_2$, $403_3$ . . . $403_{n-1}$ (for example) which indicates that the MS 408 has correctly received all of the corresponding data blocks $403_1$, $403_2$, $403_3$ . . . $403_{n-1}$ (for example) will slide a transmit window forward to reflect a next oldest data block $403_n$ that was sent but for which acknowledgment information has not yet been received in a control message from the MS 408 (see FIG. 4A's step 5b). In the case, where the control message(s) 411 contains the acknowledgement information for one or more of the sent data blocks which indicates that the MS 408 has correctly received the corresponding one or more data blocks including an oldest data block for which acknowledgment information has not yet been received, then the BSS 400 slides a transmit window forward to reflect the next oldest data block that was sent but for which acknowledgment information has not yet been received. To enable all of this, the BSS 400 at least comprises at least one processor 416 and at least one memory 418 that stores processor-executable instructions, wherein the at least one processor 416 interfaces with the at least one memory 418 to execute the processor-executable instructions to implement at least the aforementioned steps 1, 2, 4a, 4b, 4c, 5a, and 5b. Likewise, MS 408 at least comprises at least one processor 420 and at least one memory 422 that stores processor-executable instructions, wherein the at least one processor 420 interfaces with the at least one memory 422 to execute the processor-executable instructions to implement at least the aforementioned steps 1, 2, 3, 4a, and 5a.

As shown in FIG. 4B, there is a flowchart illustrating a method 400b in the radio access network node 400 for receiving at least one control message 411 with increased space for acknowledgement information and non-acknowledgment information from the MS 408 in accordance with the second embodiment of the present invention. At step 402b, the BSS 400 sends data blocks $403_1$, $403_2$ . . . $403_n$ using multiple downlink carriers $405_1$, $405_2$ . . . $405_x$ (each downlink carrier is used to transmit one or more data blocks) during a radio block period to the MS 408 which utilizes a wideband receiver to receive the data blocks $403_1$, $403_2$ . . . $403_n$ on multiple downlink carriers $405_1$, $405_2$ . . . $405_x$ (note: per DLMC there can be up to 16 downlink carriers). At step 404b, the BSS 400 sends the MS 408 a poll indication 407 which is a request for the MS 408 to send the control message(s) 411 which contain Ack/Nack information related to data blocks $403_1$, $403_2$ . . . $403_n$ (note: the poll indication 407 could be included in any of the data blocks $403_1, 403_2 \ldots 403_n$). At step 406b, the BSS 400 receives at least one radio block 409 from the MS 408. At steps 408b and 410b, the BSS 400 detects the coding scheme used in the received radio block(s) 409 and further detects whether the received radio block(s) 409 has control block(s) 413 which contain the control message(s) 411 or payload (see discussion above with respect to the first embodiment about exemplary ways that steps 408b and 410b can be performed). In this case, assume the BSS 400 receives at least one radio block 409 which contains not payload but at least one control message 411 (e.g. at least one PDAN message 411) with CS-1 or higher. At step 412b, the BSS 400 upon determining that the control message(s) 411 contains non-acknowledgement information for one or more data blocks $403_1$ (for example) will resend the one or more data blocks $403_1$ (for example) which have not been correctly received to the MS 408. At step 414b, the BSS 400 upon determining that the control message(s) 411 contains acknowledgement information for all of the data blocks $403_1, 403_2, 403_3 \ldots 403_{n-1}$ (for example) which indicates that the MS 408 has correctly received all of the corresponding data blocks $403_1, 403_2, 403_3 \ldots 403_{n-1}$ (for example) will slide a transmit window forward to reflect a next oldest data block $403_n$ that was sent but for which acknowledgment information has not yet been received in a control message from the MS 408. In the case, where the control message(s) 411 contains the acknowledgement information for one or more of the sent data blocks which indicates that the MS 408 has correctly received the corresponding one or more data blocks including an oldest data block for which acknowledgment information has not yet been received, then the BSS 400 slides a transmit window forward to reflect the next oldest data block that was sent but for which acknowledgment information has not yet been received. As discussed above, the BSS 400 has the at least one processor 416 and the at least one memory 418 that stores processor-executable instructions, wherein the at least one processor 416 interfaces with the at least one memory 418 to execute the processor-executable instructions to implement at least the aforementioned steps 402b, 404b, 406b, 408b, 410b, 412b, and 414b.

As shown in FIG. 4C, there is a flowchart illustrating a method 400c in the MS 408 for sending at least one control message 411 with increased space for acknowledgement information and non-acknowledgment information to the radio access network node 400 in accordance with the second embodiment of the present invention. At step 402c, the MS 408 receives data blocks $403_1, 403_2 \ldots 403_n$ sent on multiple downlink carriers $405_1, 405_2 \ldots 405_x$ (each downlink carrier is used to transmit one or more data blocks) during a radio block period from the radio access network node 400 (note: per DLMC there can be up to 16 downlink carriers). At step 404c, the MS 408 receives a poll indication 407 from the radio access network node 400 (note: the poll indication 407 could be included in any of the data blocks $403_1, 403_2 \ldots 403_n$). The poll indication 407 is a request for the MS 408 to send the control message(s) 411 which contain Ack/Nack information related to data blocks $403_1, 403_2 \ldots 403_n$. At step 406c, the MS 408 selects based in part at least on one or more predefined conditions a particular coding scheme which is to be used to generate the control message(s) 411. For instance, the MS 408 can select the particular coding scheme based at least in part on at least one of the following predefined condition(s): (1) a coding scheme indication 314 received from the radio access network node 400 (see discussion above related to the first embodiment of the present invention); (2) an estimated uplink channel quality based on reception of the downlink data blocks $403_1, 403_2 \ldots 403_n$; and (3) avoid the use of a coding scheme that is higher than what is required by the acknowledgment information and the non-acknowledgment information to be conveyed in the control message(s) 411. At step 408c, the MS 408 generates at least one radio block 409 which contains at least one control message 411 (e.g. at least one PDAN message 411) with CS-1 or higher. The control message(s) 411 contain at least one of acknowledgment information and non-acknowledgement information associated with a subset (all or a portion) of the data blocks $403_1, 403_2 \ldots 403_n$. At step 410c, the MS 408 sends the at least one radio block 409 which contains at least one control message 411 (e.g. at least one PDAN message 411) with CS-1 or higher on an uplink carrier 412 to the radio access network node 400 (note: the uplink carrier 412 can correspond to the downlink carrier on which the MS 408 received the data block providing the poll indication 407 or the poll indication 407 could indicate the uplink carrier 412 the MS 408 is to use for sending the control message(s) 411). As discussed above, the MS 408 has the at least one processor 420 and the at least one memory 422 that stores processor-executable instructions, wherein the at least one processor 420 interfaces with the at least one memory 422 to execute the processor-executable instructions to implement at least the aforementioned steps 402c, 404c, 406c, 408c, and 410c.

Figure 5A:
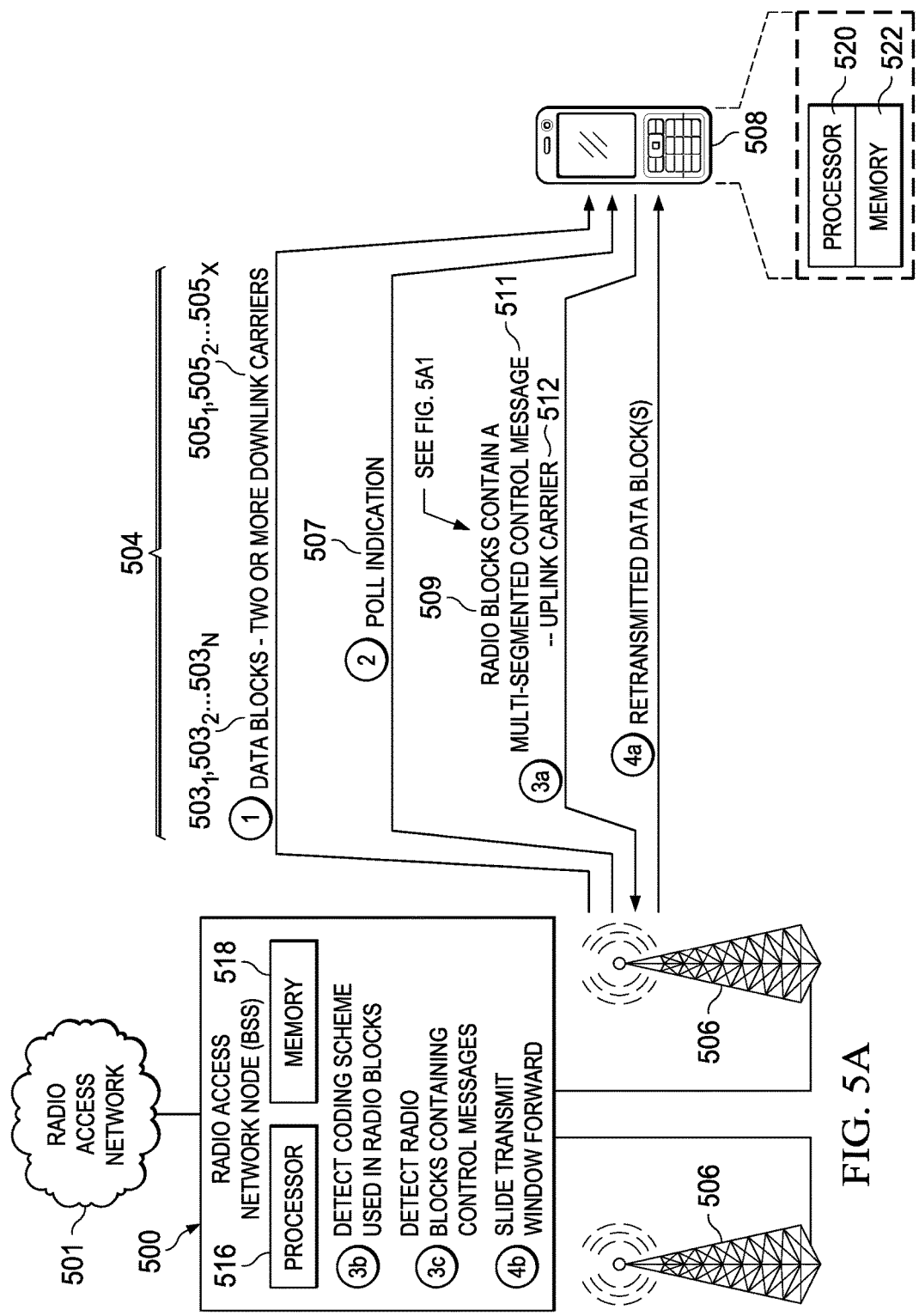
FIG. 5A is a basic system diagram showing a radio access network node (e.g., BSS) interacting with a MS (only one shown) utilizing the Downlink Multi Carrier mode in accordance with a third embodiment of the present invention.
Figure 5B:
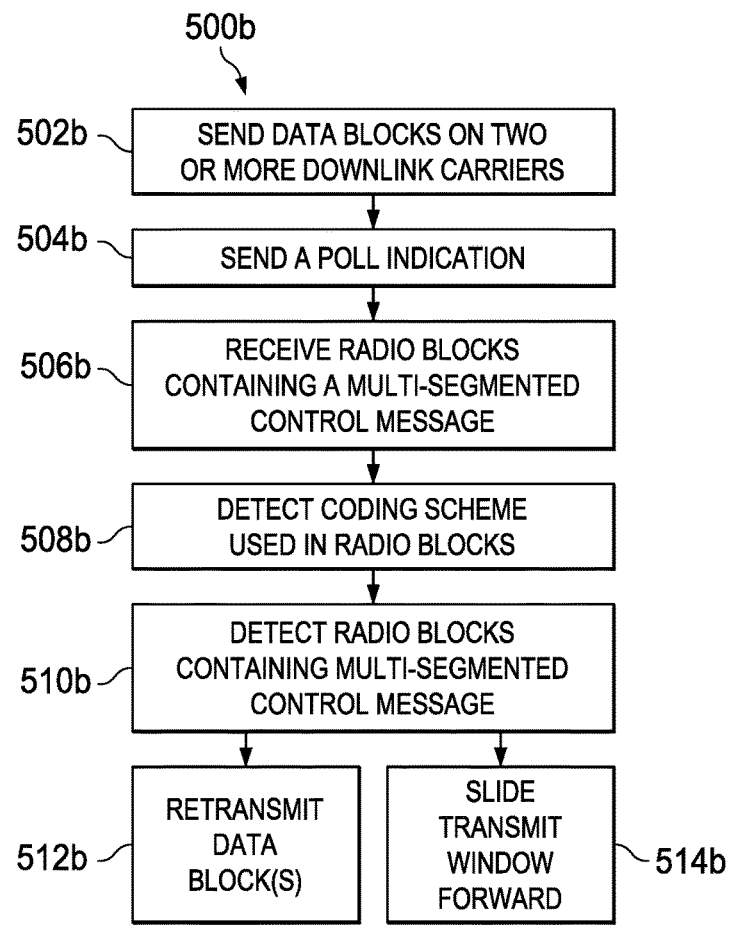
FIG. 5B is a flowchart illustrating a method implemented in the radio access network node in accordance with the third embodiment of the present invention.
Figure 5C:
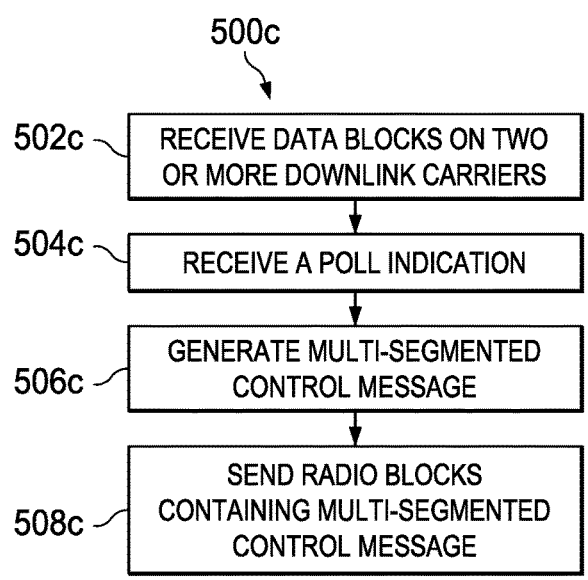
FIG. 5C is a flowchart illustrating a method implemented in the MS in accordance with the third embodiment of the present invention.

Referring to FIGS. 5A-5C, there are diagrams respectively illustrating a basic system where the radio access network node 500 (e.g., BSS 500) is interacting with the MS 508, a method 500b implemented by the radio access network node 500, and a method 500c implemented by the MS 508 in accordance with the third embodiment of the present invention. Although the description provided herein is based on the BSS 500, the GPRS radio interface 504, the MS 508 being associated with the GERAN standard it should be appreciated that the present invention could be implemented by another type of radio access network node 500, radio interface 504 and MS 508 which are associated with other standards. Further, it should be appreciated that for clarity only the components and their associated functionalities which are needed to describe and enable the present invention have been described herein.

As shown in FIG. 5A, the BSS 500 is coupled to the radio access network 501 and multiple BTSs 506 (only two shown) where the BSS 500 interacts via one of the BTSs 506 over the GPRS radio interface 504 with the MS 508 (only one shown) utilizing the Downlink Multi Carrier operation. More specifically, the BSS 500 sends data blocks $503_1, 503_2 \ldots 503_n$ using multiple downlink carriers $505_1, 505_2 \ldots 505_x$ (each downlink carrier is used to transmit one or more data blocks) during a radio block period to the MS 508 which utilizes a wideband receiver to receive the data blocks $503_1, 503_2 \ldots 503_n$ on multiple downlink carriers $505_1, 505_2 \ldots 505_x$ (see FIG. 5A's step 1—note per DLMC there can be up to 16 downlink carriers). Further, the BSS 500 sends the MS 508 a poll indication 507 which is a request for the MS 508 to send a multi-segmented control message 511 which contains Ack/Nack information related to data blocks $503_1, 503_2 \ldots 503_n$ (see FIG. 5A's step 2)(note: the poll indication 507 could be included in any of the data blocks $503_1, 503_2 \ldots 503_n$). In response, the MS 508 sends multiple radio blocks 509 which contain the multi-segmented control message 511 (e.g., multi-segmented PDAN message 511) with CS-1 or higher on an uplink carrier 512 to the BSS 500 (see FIG. 5A's step 3a—note: the particular CS used may be determined using techniques as described above with respect to the first and/or second embodiments of the present invention) (note: the uplink carrier 512 can correspond to the downlink carrier on which the MS 508 received the data block providing the poll indication 407). The multi-segmented control message 511 contains at least one of acknowledgment information and non-acknowledgement information associated with a subset (all or a portion) of the data blocks $503_1$, $503_2$ . . . $503_n$.

The multi-segmented control message 511 is yet another option of increasing the Ack/Nack bitspace where the MS 508 is allowed to send the multi-segmented control message 511 using a single or multiple uplink timeslots. The multi-segmented control message 511 could, for example, be segmented in multiple RLC blocks 509 as defined by current coding schemes. For instance, a MCS-9 block using two RLC blocks 509 would correspondingly contain two segments of the total Ack/Nack bitmap, one segment in RLC block 1 and one segment in RLC block 2, both with its own starting sequence number (note: the multiple control messages 611 of the fourth embodiment is similar to the multi-segmented control message 511 but per the previous example would have two completely distinct control messages 611 as opposed to one control message 511 having two parts). FIG. 5A1 is a block diagram illustrating an exemplary RLC/MAC control message which is segmented into three parts. This exemplary RLC/MAC control message is sent in three radio blocks #s 1, 2, and 3 where (1) radio block #1 comprises a control block 513a with a MAC header 515a, a control message part 1 (RLC/MAC control message part 1—with Ack/Nack information part 1) and a BCS field 517a; (2) radio block #2 comprises a control block 513b with a MAC header 515b, a control message part 2 (RLC/MAC control message part 2—with Ack/Nack information part 2) and a BCS field 517b; and (3) radio block #3 comprises a control block 513c with a MAC header 515c, a control message part 3 (RLC/MAC control message part 3—with Ack/Nack information part 3) and a BCS field 517c. The control message parts 1 (511a), 2 (511b), and 3 (511c) make-up the multi-segmented control message 511.

Upon receiving the radio blocks 509 (e.g., radio blocks #s 1, 2, and 3), the BSS 500 detects the coding scheme used in the received radio blocks 509 and further detects whether the received radio blocks 509 have control blocks 513 (e.g., control blocks 513a, 513b and 513c) which contain the control message 511 (e.g., control message parts 511a, 511b and 511c) or payload (see FIG. 5A's steps 3b and 3c which assume the received radio blocks 509 contain the control message 511) (see discussion above with respect to the first embodiment for an explanation about different exemplary ways that the BSS 500 can perform steps 3b and 3c). Thereafter, the BSS 500 upon determining that the control message 511 contains non-acknowledgement information for one or more data blocks $503_1$ (for example) will resend the one or more data blocks $503_1$ (for example) which have not been correctly received by the MS 508 (see FIG. 5A's step 4a). The BSS 500 upon determining that the control message 511 (e.g., control message parts 511a, 511b and 511c) contains acknowledgement information for all of the data blocks $503_1$, $503_2$, $503_3$ . . . $503_{n-1}$ (for example) which indicates that the MS 508 has correctly received all of the corresponding data blocks $503_1$, $503_2$, $503_3$ . . . $503_{n-1}$ (for example) will slide a transmit window forward to reflect a next oldest data block $503_n$ that was sent but for which acknowledgment information has not yet been received in a control message from the MS 508 (see FIG. 5A's step 4b). To enable all of this, the BSS 500 at least comprises at least one processor 516 and at least one memory 518 that stores processor-executable instructions, wherein the at least one processor 516 interfaces with the at least one memory 518 to execute the processor-executable instructions to implement at least the aforementioned steps 1, 2, 3a, 3b, 3c, 4a, and 4b. Likewise, MS 508 comprises at least one processor 520 and at least one memory 522 that stores processor-executable instructions, wherein the at least one processor 520 interfaces with the at least one memory 522 to execute the processor-executable instructions to implement at least the aforementioned steps 1, 2, 3a, and 4a.

As shown in FIG. 5B, there is a flowchart illustrating a method 500b in the radio access network node 500 for receiving at least one control message 511 with increased space for acknowledgement information and non-acknowledgment information from the MS 508 in accordance with the third embodiment of the present invention. At step 502b, the BSS 500 sends data blocks $503_1$, $503_2$ . . . $503_n$ using multiple downlink carriers $505_1$, $505_2$ . . . $505_x$ (each downlink carrier is used to transmit one or more data blocks) during a radio block period to the MS 508 which utilizes a wideband receiver to receive the data blocks $503_1$, $503_2$ . . . $503_n$ on multiple downlink carriers $505_1$, $505_2$ . . . $505_x$ (note: per DLMC there can be up to 16 downlink carriers). At step 504b, the BSS 500 sends the MS 508 a poll indication 507 which is a request for the MS 508 to send the multi-segmented control message 511 which contains Ack/Nack information related to data blocks $503_1$, $503_2$ . . . $503_n$ (note: the poll indication 507 could be included in any of the data blocks $503_1$, $503_2$ . . . $503_n$). At step 506b, the BSS 500 receives multiple radio blocks 509 which contain the multi-segmented control message 511 (e.g., multi-segmented PDAN message 511) with CS-1 or higher on an uplink carrier 512. The multi-segmented control message 511 contains at least one of acknowledgment information and non-acknowledgement information associated with a subset (all or a portion) of the data blocks $503_1$, $503_2$ . . . $503_n$. At steps 508b and 510b, the BSS 500 detects the coding scheme used in the received radio blocks 509 and further detects whether the received radio blocks 509 have control blocks 513 (e.g., control blocks 513a, 513b and 513c) which contain the control message 511 (e.g., control message parts 511a, 511b and 511c) or payload (see discussion above with respect to the first embodiment about exemplary ways that steps 508b and 510b can be performed). In this case, assume the BSS 500 receives radio blocks 509 which contain not payload but the control message 511 (e.g., control message parts 511a, 511b and 511c) with CS-1 or higher. At step 512b, the BSS 500 upon determining that the control message 511 (e.g., control message parts 511a, 511b and 511c) contains non-acknowledgement information for one or more data blocks $503_1$ (for example) will resend the one or more data blocks $503_1$ (for example) which have not been correctly received to the MS 508. At step 514b, the BSS 500 upon determining that the control message 511 (e.g., control message parts 511a, 511b and 511c) contains acknowledgement information for all of the data blocks $503_2$, $503_3$ . . . $503_{n-1}$ (for example) which indicates that the MS 508 has correctly received all of the corresponding one or more data blocks $503_2$, $503_3$ . . . $503_{n-1}$ (for example) will slide a transmit window forward to reflect a next oldest data block $503_n$ that was sent but for which acknowledgment information has not yet been received in a control message from the MS 508. In the case, where the control message 511 contains the acknowledgement information for one or more of the sent data blocks which indicates that the MS 508 has correctly received the corresponding one or more data blocks including an oldest data block for which acknowledgment information has not yet been received, then the BSS 500 slides a transmit window forward to reflect the next oldest data block that was sent but for which acknowledgment information has not yet been received. As discussed above, the BSS 500 has the at least one processor 516 and the at least one memory 518 that stores processor-executable instructions, wherein the at least one processor 516 interfaces with the at least one memory 518 to execute the processor-executable instructions to implement at least the aforementioned steps 502b, 504b, 506b, 508b, 510b, 512b, and 514b.

As shown in FIG. 5C, there is a flowchart illustrating a method 500c in the MS 508 for sending at least one control message 511 with increased space for acknowledgement information and non-acknowledgment information to the radio access network node 500 in accordance with the third embodiment of the present invention. At step 502c, the MS 508 receives data blocks $503_1, 503_2 \ldots 503_n$ sent on multiple downlink carriers $505_1, 505_2 \ldots 505_x$ (each downlink carrier contains one or more data blocks) during a radio block period from the radio access network node 500 (note: per DLMC there can be up to 16 downlink carriers). At step 504c, the MS 508 receives a poll indication 507 from the radio access network node 500 (note: the poll indication 507 could be included in any of the data blocks $503_1, 503_2 \ldots 503_n$). The poll indication 507 is a request for the MS 508 to send the multi-segmented control message 511 which contain Ack/Nack information related to data blocks $503_1, 503_2 \ldots 503_n$. At step 506c, the MS 508 generates multiple radio blocks 509 which contain the multi-segmented control message 511 (e.g., multi-segmented PDAN message 511) with CS-1 or higher (note: the particular CS used may be determined using techniques as described above with respect to the first and/or second embodiments of the present invention). The multi-segmented control message 511 contains at least one of acknowledgment information and non-acknowledgement information associated with a subset (all or a portion) of the data blocks $503_1, 503_2 \ldots 503_n$. At step 508c, the MS 508 sends the radio blocks 509 which contains the multi-segmented control message 511 with CS-1 or higher on an uplink carrier 512 to the radio access network node 500 (note: the uplink carrier 512 can corresponds to the downlink carrier on which the MS 508 received the data block providing the poll indication 507 or the poll indication 507 could indicate the uplink carrier 512 the MS 508 is to use for sending the multi-segmented control message 511). As discussed above, the MS 508 has the at least one processor 520 and the at least one memory 522 that stores processor-executable instructions, wherein the at least one processor 520 interfaces with the at least one memory 522 to execute the processor-executable instructions to implement at least the aforementioned steps 502c, 504c, 506c, and 508c.

Figure 6A:
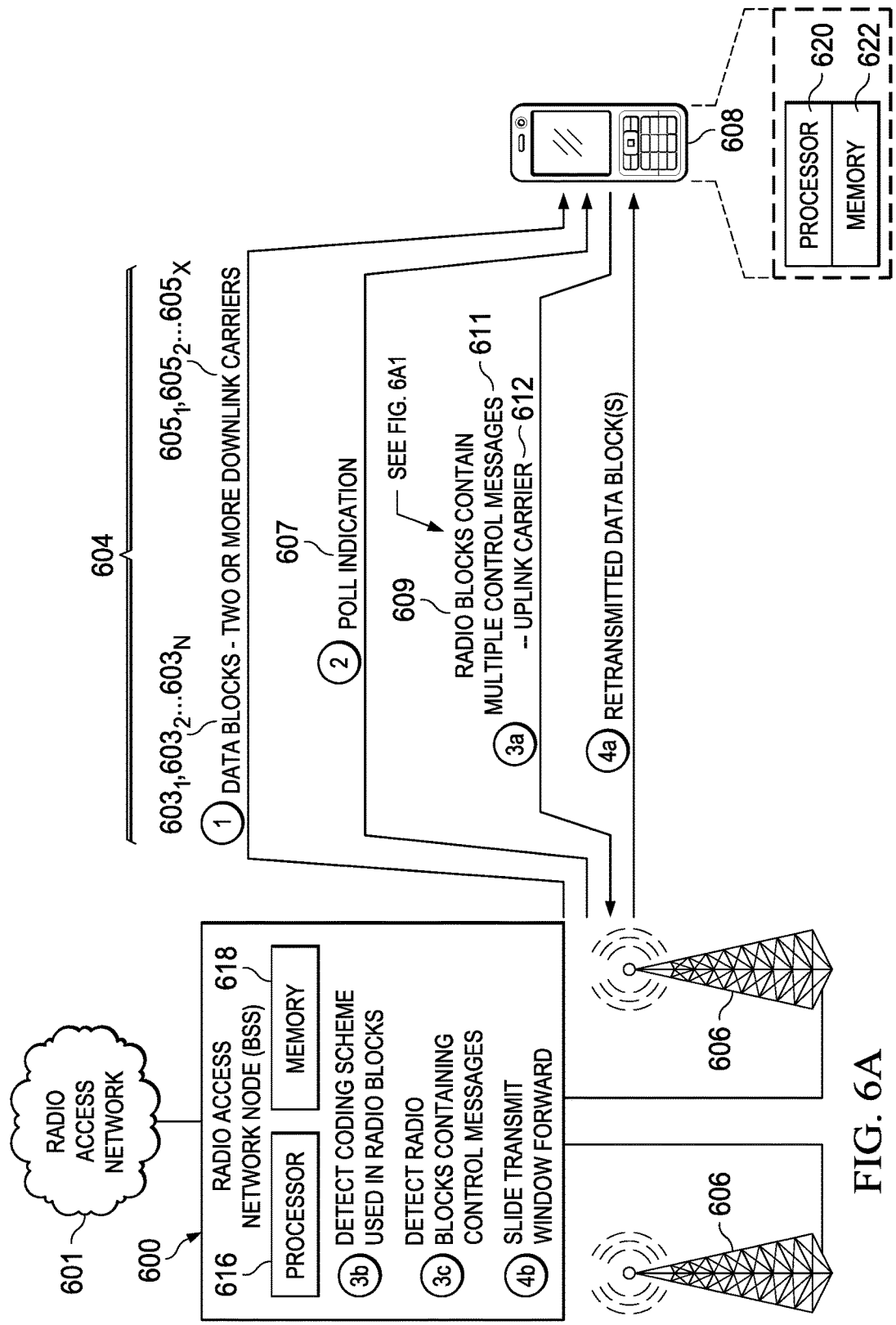
FIG. 6A is a basic system diagram showing a radio access network node (e.g., BSS) interacting with a MS (only one shown) utilizing the Downlink Multi Carrier mode in accordance with a fourth embodiment of the present invention.
Figure 6B:
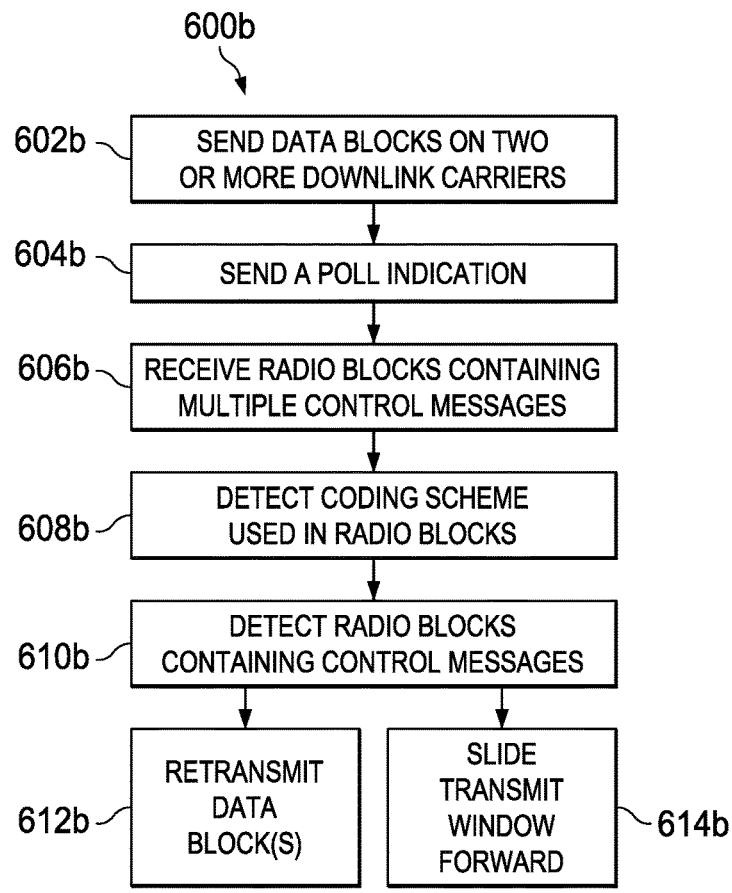
FIG. 6B is a flowchart illustrating a method implemented in the radio access network node in accordance with the fourth embodiment of the present invention.
Figure 6C:
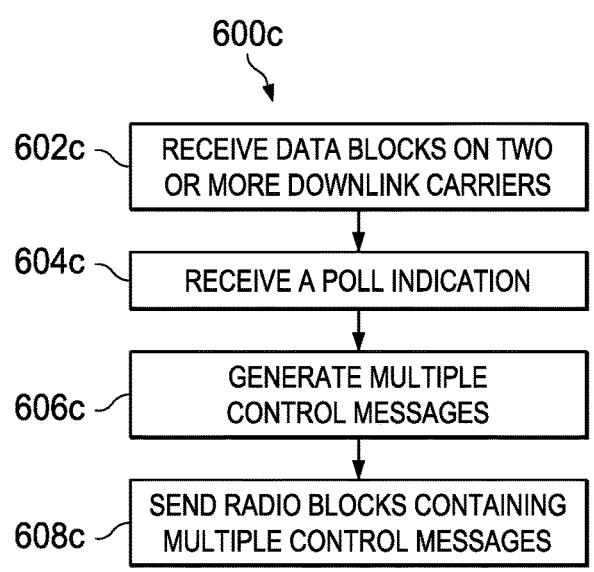
FIG. 6C is a flowchart illustrating a method implemented in the MS in accordance with the fourth embodiment of the present invention.

Referring to FIGS. 6A-6C, there are diagrams respectively illustrating a basic system where the radio access network node 600 (e.g., BSS 600) is interacting with the MS 608, a method 600b implemented by the radio access network node 600, and a method 600c implemented by the MS 608 in accordance with the fourth embodiment of the present invention. Although the description provided herein is based on the BSS 600, the GPRS radio interface 604, the MS 608 being associated with the GERAN standard it should be appreciated that the present invention could be implemented by another type of radio access network node 600, radio interface 604 and MS 608 which are associated with other standards. Further, it should be appreciated that for clarity only the components and their associated functionalities which are needed to describe and enable the present invention have been described herein.

As shown in FIG. 6A, the BSS 600 is coupled to the radio access network 601 and multiple BTSs 606 (only two shown) where the BSS 600 interacts via one of the BTSs 606 over the GPRS radio interface 604 with the MS 608 (only one shown) utilizing the Downlink Multi Carrier operation. More specifically, the BSS 600 sends data blocks $603_1, 603_2 \ldots 603_n$ using multiple downlink carriers $605_1, 605_2 \ldots 605_x$ (each downlink carrier is used to transmit one or more data blocks) during a radio block period to the MS 608 which utilizes a wideband receiver to receive the data blocks $603_1, 603_2 \ldots 603_n$ on multiple downlink carriers $605_1, 605_2 \ldots 605_x$) (see FIG. 6A's step 1—note per DLMC there can be up to 16 downlink carriers). Further, the BSS 600 sends the MS 608 a poll indication 607 which is a request for the MS 608 to send a multiple control messages 611 which contain Ack/Nack information related to data blocks $603_1, 603_2 \ldots 603_n$ (see FIG. 6A's step 2) (note: the poll indication 607 could be included in any of the data blocks $603_1, 603_2 \ldots 603_n$). In response to the poll indication 607, the MS 608 sends multiple radio blocks 609 which contain the multiple control messages 611 (e.g., multiple PDAN messages 611) with CS-1 or higher on an uplink carrier 612 to the BSS 600 (note: the uplink carrier 612 can correspond to the downlink carrier on which the MS 608 received the data block providing the poll indication 607 or the poll indication 607 could indicate the uplink carrier 612 the MS 608 is to use for sending the multiple control messages 611) (see FIG. 6A's step 3a—note: the particular CS used may be determined using techniques described above with respect to the first and/or second embodiments of the present invention). The multiple control messages 611 contain at least one of acknowledgment information and non-acknowledgement information associated with a subset (all or a portion) of the data blocks $603_1, 603_2 \ldots 603_n$. FIG. 6A1 is a block diagram illustrating an exemplary multiple control messages 611 which is sent in three radio blocks #s 1, 2, and 3 where (1) radio block #1 comprises a control block 613a with a MAC header 615a, a control message 1 (RLC/MAC control message 1—with Ack/Nack information part 1) and a BCS field 617a; (2) radio block #2 comprises a control block 613b with a MAC header 615b, a control message 2 (RLC/MAC control message 2—with Ack/Nack information part 2) and a BCS field 617b; and (3) radio block #3 comprises a control block 613c with a MAC header 615c, a control message 3 (RLC/MAC control message 3—with Ack/Nack information part 3) and a BCS field 617c.

Upon receiving the radio blocks 609 (e.g., radio blocks #s 1, 2, and 3), the BSS 600 detects the coding scheme used in the received radio blocks 609 and further detects whether the received radio blocks 609 have control blocks 613 (e.g., control blocks 613a, 613b and 613c) which contain the multiple control messages 611 (e.g., control messages 611a, 611b and 611c) or payload (see FIG. 6A's steps 3b and 3c which assume the received radio blocks 609 contain the control messages 611) (see discussion above with respect to the first embodiment for an explanation about different exemplary ways that the BSS 600 can perform steps 3b and 3c). Thereafter, the BSS 600 upon determining that the control message 611 contains non-acknowledgement information for one or more data blocks $603_1$ (for example) will resend the one or more data blocks $603_1$ (for example) which have not been correctly received to the MS 608 (see FIG. 6A's step 4a). And, the BSS 600 upon determining that the control message 611 (e.g., control messages 611a, 611b and 611c) contain acknowledgement information for all of data blocks $603_1, 603_2, 603_3 \ldots 603_{n-1}$ (for example) which indicates that the MS 608 has correctly received all of the corresponding data blocks $603_1$, $603_2$, $603_3$ . . . $603_{n-1}$ (for example) will slide a transmit window forward to reflect a next oldest data block $603_n$ that was sent but for which acknowledgment information has not yet been received in a control message from the MS 608 (see FIG. 6A's step 4*b*). In the case, where the control messages 611 contains the acknowledgement information for one or more of the sent data blocks which indicates that the MS 608 has correctly received the corresponding one or more data blocks including an oldest data block for which acknowledgment information has not yet been received, then the BSS 600 slides a transmit window forward to reflect the next oldest data block that was sent but for which acknowledgment information has not yet been received. To enable all of this, the BSS 600 at least comprises at least one processor 616 and at least one memory 618 that stores processor-executable instructions, wherein the at least one processor 616 interfaces with the at least one memory 618 to execute the processor-executable instructions to implement at least the aforementioned steps 1, 2, 3*a*, 3*b*, 3*c*, 4*a*, and 4*b*. Likewise, MS 608 at least comprises at least one processor 620 and at least one memory 622 that stores processor-executable instructions, wherein the at least one processor 620 interfaces with the at least one memory 622 to execute the processor-executable instructions to implement at least the aforementioned steps 1, 2, 3*a*, and 4*a*. As shown in FIG. 6B, there is a flowchart illustrating a method 600*b* in the radio access network node 600 for receiving at least one control message 611 with increased space for acknowledgement information and non-acknowledgment information from the MS 608 in accordance with the fourth embodiment of the present invention. At step 602*b*, the BSS 600 sends data blocks $603_1$, $603_2$ . . . $603_n$ using multiple downlink carriers $605_1$, $605_2$ . . . $605_x$ (each downlink carrier is used to transmit one or more data blocks) during a radio block period to the MS 608 which utilizes a wideband receiver to receive the data blocks $603_1$, $603_2$ . . . $603_n$ on multiple downlink carriers $605_1$, $605_2$ . . . $605_x$ (note: per DLMC there can be up to 16 downlink carriers). At step 604*b*, the BSS 600 sends the MS 608 a poll indication 607 which is a request for the MS 608 to send the multiple control messages 611 which contains Ack/Nack information related to data blocks $603_1$, $603_2$ . . . $603_n$ (note: the poll indication 607 could be included in any of the data blocks $603_1$, $603_2$ . . . $603_n$). At step 606*b*, the BSS 600 receives multiple radio blocks 609 which contain the multiple control message 611 (e.g., multiple PDAN messages 611) with CS-1 or higher on an uplink carrier 612 from the MS 608 (note: the uplink carrier 612 can correspond to the downlink carrier on which the MS 608 received the data block providing the poll indication 607 or the poll indication 607 could indicate the uplink carrier 612 the MS 608 is to use for sending the multiple control messages 611). The multiple control messages 611 contain at least one of acknowledgment information and non-acknowledgement information associated with a subset (all or a portion) of the data blocks $603_1$, $603_2$ . . . $603_n$. At steps 608*b* and 610*b*, the BSS 600 detects the coding scheme used in the received radio blocks 609 and further detects whether the received radio blocks 609 have control blocks 613 (e.g., control blocks 613*a*, 613*b* and 613*c*) which contain the control messages 611 (e.g., control messages 611*a*, 611*b* and 611*c*) or payload (see discussion above with respect to the first embodiment about exemplary ways that steps 608*b* and 610*b* can be performed). In this case, assume the BSS 600 receives radio blocks 609 which contain not payload but the control messages 611 (e.g., control messages 611*a*, 611*b* and 611*c*) with CS-1 or higher. At step 612*b*, the BSS 600 upon determining that the control messages 611 (e.g., control messages 611*a*, 611*b* and 611*c*) contain non-acknowledgement information for one or more data blocks $603_1$ (for example) will resend the one or more data blocks $603_1$ (for example) which have not been correctly received to the MS 608. At step 614*b*, the BSS 600 upon determining that the control messages 611 (e.g., control messages 611*a*, 611*b* and 611*c*) contain acknowledgement information for all of data blocks $603_1$, $603_2$, $603_3$ . . . $603_{n-1}$ (for example) which indicates that the MS 608 has correctly received all of the corresponding data blocks $603_1$, $603_2$, $603_3$ . . . $603_{n-1}$ (for example) will slide a transmit window forward to reflect a next oldest data block $603_n$ that was sent but for which acknowledgment information has not yet been received in a control message from the MS 608. In the case, where the control messages 611 contains the acknowledgement information for one or more of the sent data blocks which indicates that the MS 608 has correctly received the corresponding one or more data blocks including an oldest data block for which acknowledgment information has not yet been received, then the BSS 600 slides a transmit window forward to reflect the next oldest data block that was sent but for which acknowledgment information has not yet been received. As discussed above, the BSS 600 has the at least one processor 616 and the at least one memory 618 that stores processor-executable instructions, wherein the at least one processor 616 interfaces with the at least one memory 618 to execute the processor-executable instructions to implement at least the aforementioned steps 602*b*, 604*b*, 606*b*, 608*b*, 610*b*, 612*b*, and 614*b*.

As shown in FIG. 6C, there is a flowchart illustrating a method 600*c* in the MS 608 for sending at least one control message 611 with increased space for acknowledgement information and non-acknowledgment information to the radio access network node 600 in accordance with the fourth embodiment of the present invention. At step 602*c*, the MS 608 receives data blocks $603_1$, $603_2$ . . . $603_n$ sent on multiple downlink carriers $605_1$, $605_2$ . . . $605_x$ (each downlink carrier is used to transmit one or more data blocks) during a radio block period from the radio access network node 600 (note: per DLMC there can be up to 16 downlink carriers). At step 604*c*, the MS 608 receives a poll indication 607 from the radio access network node 600 (note: the poll indication 607 could be included in any of the data blocks $603_1$, $603_2$ . . . $603_n$). The poll indication 607 is a request for the MS 608 to send multiple control messages 611 which contain Ack/Nack information related to data blocks $603_1$, $603_2$ . . . $603_n$. At step 606*c*, the MS 608 generates multiple radio blocks 609 which contain the multiple control messages 611 (e.g., multiple PDAN messages 611) with CS-1 or higher (note: the particular CS used may be determined using techniques as described above with respect to the first and/or second embodiments of the present invention). The multiple control messages 611 contain at least one of acknowledgment information and non-acknowledgement information associated with a subset (all or a portion) of the data blocks $603_1$, $603_2$ . . . $603_n$. At step 608*c*, the MS 608 sends the radio blocks 609 which contain the multiple control messages 611 with CS-1 or higher on an uplink carrier 612 to the radio access network node 600. As discussed above, the MS 608 has the at least one processor 620 and the at least one memory 622 that stores processor-executable instructions, wherein the at least one processor 620 interfaces with the at least one memory 622 to execute the processor-executable instructions to implement at least the aforementioned steps 602*c*, 604*c*, 606*c*, and 608*c*.

APPENDIX

GPRS is a packet switched service in GSM. The smallest entity is called a radio block and it consists of four normal bursts. A radio block can be transmitted over the radio interface using any of the four coding schemes that are available. The coding schemes are CS-1 to CS-4. The lower coding schemes have a high amount of channel coding and give a low data rate. The higher coding schemes have less channel coding and give a higher data rate.

The most robust coding scheme (CS-1) is used for transmission of all radio blocks that carry RLC/MAC control messages. Radio blocks can also carry RLC data blocks, and in such case any of the four coding schemes can be used. The coding schemes are summarized in TABLE 1 below:

TABLE 1

The GPRS Coding Schemes

| Coding Scheme | RLC data block size (Bytes) | RLC data bit rate (kbps) |
|---|---|---|
| CS-1 | 20 | 8.0 |
| CS-2 | 30 | 12.0 |
| CS-3 | 36 | 14.4 |
| CS-4 | 50 | 20.0 |

The objective of GPRS Link Adaptation is to dynamically select the most optimal coding scheme for downlink transmission of data over the radio interface.

Enhanced GPRS (EGPRS) supports the GMSK and 8-PSK modulation methods on the radio interface and defines nine Modulation and Coding Schemes (MCSs). MCS-1 to MCS-4 are modulated with GMSK and MCS-5 to MCS-9 are modulated with 8-PSK.

The maximum data rates for the GMSK based MCSs are in general reached at a lower radio link quality than for the MCSs that are based on 8-PSK. 8-PSK is less robust than GMSK but gains from an improved radio link quality where the gain for GMSK is negligible.

For each modulation method the low MCSs have high amounts of channel coding, giving low data rates. The high MCSs have less channel coding which gives high data rates. In the end, it is the combination of modulation method and amount of channel coding that determines the characteristics of an MCS. The MCSs are summarized in TABLE 2

TABLE 2

The MCSs in EGPRS

| MCS | Modulation | Coding family | RLC data block size (Bytes) | RLC data bit rate (kbps) |
|---|---|---|---|---|
| MCS-1 | GMSK | C | 22 | 8.8 |
| MCS-2 | GMSK | B | 28 | 11.2 |
| MCS-3 | GMSK | A | 37 | 14.8 |
| MCS-4 | GMSK | C | 2 × 22 | 17.6 |
| MCS-5 | 8-PSK | B | 2 × 28 | 22.4 |
| MCS-6 | 8-PSK | A | 2 × 37 | 29.6 |
| MCS-7 | 8-PSK | B | 4 × 28 | 44.8 |
| MCS-8 | 8-PSK | A | 4 × 34 | 54.4 |
| MCS-9 | 8-PSK | A | 4 × 37 | 59.2 |

In EGPRS the RLC protocol is enhanced with the possibility to re-segment data within the same coding family. Hence, it is possible to retransmit a radio block with a different MCS. The enhanced RLC protocol also makes it possible for the receiver to store and use information (soft values) from previous transmissions of the same RLC data block in order to increase the probability of successful decoding. This is called Incremental Redundancy (IR). The old soft values can be combined with new soft values from the same RLC data block if the RLC data block has not been re-segmented. The receiver will store the soft values until the RLC data block has been successfully decoded.

EGPRS also supports the Bit Error Probability (BEP) measurement, which is an improved radio link quality measurement. The mean value and the coefficient of variation of BEP reflect not only the C/I, but also factors like time dispersion and interleaving gain caused by velocity and frequency hopping.

The objective of EGPRS Link Quality Control (LQC) is to dynamically select the most optimal MCS for transmission of data over the radio interface.

For EGPRS2-A, new MCSs, called EGPRS2 Downlink Level A modulation and coding schemes (DAS), are used for 8-PSK, 16-QAM and 32-QAM. MCS-1 to MCS-4 are used for GMSK. MCS-6 to MCS-8 are also included and can be used for retransmission of EGPRS coded blocks after a TBF level change from EGPRS to EGPRS2-A. MCS-7 and MCS-8 can be used when 8-PSK is needed to send a PAN and/or USF to an EGPRS capable mobile station.

TABLE 3

The new MCSs in EGPRS2-A downlink

| MCS | Modulation | Coding family | RLC data block size (Bytes) | RLC data bit rate (kbps) |
|---|---|---|---|---|
| DAS-5 | 8-PSK | B | 2 × 28 | 22.4 |
| DAS-6 | 8-PSK | Ap | 2 × 34 | 27.2 |
| DAS-7 | 8-PSK | Bp | 2 × 41 | 32.8 |
| DAS-8 | 16-QAM | B | 4 × 28 | 44.8 |
| DAS-9 | 16-QAM | Ap | 4 × 34 | 54.4 |
| DAS-10 | 32-QAM | Bp | 4 × 41 | 65.6 |
| DAS-11 | 32-QAM | Ap | 6 × 34 | 81.6 |
| DAS-12 | 32-QAM | Bp | 6 × 41 | 98.4 |

For EGPRS2-A uplink, new MCSs called EGPRS2 Uplink Level A modulation and coding schemes (UAS), are used for 16-QAM modulation. MCS-1 to MCS-6 are used for GMSK and 8-PSK modulations.

TABLE 4

The new MCSs in EGPRS2-A uplink

| MCS | Modulation | Coding family | RLC data block size (Bytes) | RLC data bit rate (kbps) |
|---|---|---|---|---|
| UAS-7 | 16-QAM | B | 4 × 28 | 44.8 |
| UAS-8 | 16-QAM | Apad10 | 4 × 32 | 51.2 |
| UAS-9 | 16-QAM | A | 4 × 37 | 59.2 |
| UAS-10 | 16-QAM | B | 6 × 28 | 67.2 |
| UAS-11 | 16-QAM | Apad10 | 6 × 32 | 76.8 |

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A radio access network node configured to interact with a mobile station, the radio access network node comprising:
   at least one processor; and,
   at least one memory that stores processor-executable instructions, wherein the at least one processor interfaces with the at least one memory to execute the processor-executable instructions, whereby the radio access network node is operable to:

send data blocks to the mobile station using two or more downlink carriers within a single radio block period;

send an indication to the mobile station indicating that the mobile station is to use a coding scheme 3 (CS-3) to generate a Packet Downlink Ack/Nack (PDAN) message, and, receive a CS-3 coded PDAN message from the mobile station, wherein the received CS-3 coded PDAN message contains at least one of acknowledgment information and non-acknowledgement information associated with a subset of the sent data blocks.

2. The radio access network node of claim 1, wherein the radio access network node is operable to send a Packet Associated Control Channel (PACCH) message including the indication to the mobile station indicating that the mobile station is to use the CS-3 to generate the PDAN message.

3. The radio access network node of claim 1, wherein the radio access network node is operable to send a Packet Uplink Ack/Nack (PUAN) message including the indication to the mobile station indicating that the mobile station is to use the CS-3 to generate the PDAN message.

4. The radio access network node of claim 1, wherein the radio access network node is operable to determine the CS-3 that the mobile station is to use to generate the PDAN message based on at least one predefined condition which follows:
a received uplink signal level in view of predefined thresholds;
an estimated bit error rate probability (BEP) for uplink in view of predefined thresholds;
an estimated block error rate probability (BLEP) for uplink in view of predefined thresholds;
a total number of downlink timeslots assigned in view of predefined thresholds; and,
a downlink coding scheme used to send the data blocks to the mobile station.

5. The radio access network node of claim 1, wherein the radio access network node is further operable to:
based on the received CS-3 coded PDAN message containing the non-acknowledgement information for one or more of the sent data blocks which indicates that the mobile station has not correctly received the corresponding one or more data blocks, retransmit the one or more data blocks which have not been correctly received by the mobile station; and,
based on the received CS-3 coded PDAN message containing the acknowledgement information for one or more of the sent data blocks which indicates that the mobile station has correctly received the corresponding one or more data blocks including an oldest data block that was sent, slide a transmit window forward to reflect the next oldest data block that was sent but for which acknowledgment information has not yet been received in a CS-3 coded PDAN message from the mobile station.

6. The radio access network node of claim 1, wherein the radio access network node is operable to send a poll indication to the mobile station where the poll indication triggers the mobile station to send the CS-3 coded PDAN message.

7. The radio access network node of claim 1, wherein one of the data blocks includes a poll indication which triggers the mobile station to send the CS-3 coded PDAN message.

8. A method in a radio access network node configured to interact with a mobile station, the method comprising:
sending, by the radio access network node, data blocks to the mobile station using two or more downlink carriers within a single radio block period;

sending, by the radio access network node, an indication to the mobile station indicating that the mobile station is to use a coding scheme 3 (CS-3) to generate a Packet Downlink Ack/Nack (PDAN) message, and, receiving, by the radio access network node, a CS-3 coded PDAN message from the mobile station, wherein the received CS-3 coded PDAN message contains at least one of acknowledgment information and non-acknowledgement information associated with a subset of the sent data blocks.

9. The method of claim 8, wherein the radio access network node sends a Packet Associated Control Channel (PACCH) message including the indication to the mobile station indicating that the mobile station is to use the CS-3 to generate the PDAN message.

10. The method of claim 8, wherein the radio access network node sends a Packet Uplink Ack/Nack (PUAN) message including the indication to the mobile station indicating that the mobile station is to use the CS-3 to generate the PDAN message.

11. The method of claim 8, further comprising:
determining, by the radio access network node, that the mobile station is to use CS-3 to generate the PDAN message based on at least one predefined condition which follows:
a received uplink signal level in view of predefined thresholds;
an estimated bit error rate probability (BEP) for uplink in view of predefined thresholds;
an estimated block error rate probability (BLEP) for uplink in view of predefined thresholds;
a total number of downlink timeslots assigned in view of predefined thresholds; and,
a downlink coding scheme used to send the data blocks to the mobile station.

12. The method of claim 8, further comprising:
based on the received CS-3 coded PDAN message containing the non-acknowledgement information for one or more of the sent data blocks which indicates that the mobile station has not correctly received the corresponding one or more data blocks, retransmitting the one or more data blocks which have not been correctly received by the mobile station; and,
based on the received CS-3 coded PDAN message containing the acknowledgement information for one or more of the sent data blocks which indicates that the mobile station has correctly received the corresponding one or more data blocks including an oldest data block that was sent, sliding a transmit window forward to reflect the next oldest data block that was sent but for which acknowledgment information has not yet been received in a CS-3 coded PDAN message from the mobile station.

13. The method of claim 8, further comprising:
sending a poll indication to the mobile station where the poll indication triggers the mobile station to send the CS-3 coded PDAN message.

14. The method of claim 8, wherein one of the data blocks includes a poll indication which triggers the mobile station to send the CS-3 coded PDAN message.

15. A mobile station configured to interact with a radio access network node, the mobile station comprising:
at least one processor; and,
at least one memory that stores processor-executable instructions, wherein the at least one processor interfaces with the at least one memory to execute the processor-executable instructions, whereby the mobile station is operable to:

receive, from the radio access network node, data blocks on two or more downlink carriers within a single radio block period;

receive, from the radio access network node, an indication indicating that the mobile station is to use a coding scheme 3 (CS-3) to generate a Packet Downlink Ack/Nack (PDAN) message, and, send, to the radio access network node, a CS-3 coded PDAN message which contains at least one of acknowledgment information and non-acknowledgement information associated with a subset of sent data blocks.

16. The mobile station of claim 15, wherein the mobile station is operable to:

receive a Packet Associated Control Channel (PACCH) message which includes the indication indicating that the mobile station is to use the CS-3 to generate the PDAN message.

17. The mobile station of claim 15, wherein the mobile station is operable to:

receive a Packet Uplink Ack/Nack (PUAN) message which includes the indication indicating that the mobile station is to use the CS-3 to generate the PDAN message.

18. The mobile station of claim 15, wherein the mobile station is operable to:

receive, from the radio access network node, a poll indication which triggers the mobile station to send the CS-3 coded PDAN message.

19. The mobile station of claim 15, wherein one of the data blocks includes a poll indication which triggers the mobile station to send the CS-3 coded PDAN message.

20. The mobile station of claim 15, wherein the mobile station is operable to:

generate the CS-3 coded PDAN message to contain the non-acknowledgement information for one or more of the sent data blocks which have not been correctly received; and, generate the CS-3 coded PDAN message to contain the acknowledgement information for one or more of the sent data blocks which have been correctly received.

21. A method in a mobile station configured to interact with a radio access network node, the method comprising:

receiving, from the radio access network node, data blocks on two or more downlink carriers within a single radio block period;

receiving, from the radio access network node, an indication indicating that the mobile station is to use a coding scheme 3 (CS-3) to generate a Packet Downlink Ack/Nack (PDAN) message, and, sending, to the radio access network node, a CS-3 coded PDAN message which contains at least one of acknowledgment information and non-acknowledgement information associated with a subset of sent data blocks.

22. The method of claim 21, wherein the mobile station receives a Packet Associated Control Channel (PACCH) message which includes the indication indicating that the mobile station is to use the CS-3 to generate the PDAN message.

23. The method of claim 21, wherein the mobile station receives a Packet Uplink Ack/Nack (PUAN) message which includes the indication indicating that the mobile station is to use the CS-3 to generate the PDAN message.

24. The method of claim 21, further comprising:

receiving, from the radio access network node, a poll indication which triggers the mobile station to send the CS-3 coded PDAN message.

25. The method of claim 21, wherein one of the data blocks includes a poll indication which triggers the mobile station to send the CS-3 coded PDAN message.

26. The method of claim 21, further comprising:

generating the CS-3 coded PDAN message to contain the non-acknowledgement information for one or more of the sent data blocks which have not been correctly received; and, generating the CS-3 coded PDAN message to contain the acknowledgement information for one or more of the sent data blocks which have been correctly received.

* * * * *